(12) United States Patent
Feng et al.

(10) Patent No.: US 12,504,792 B2
(45) Date of Patent: Dec. 23, 2025

(54) FOLDABLE ASSEMBLY AND ELECTRONIC DEVICE

(71) Applicant: Honor Device Co., Ltd., Shenzhen (CN)

(72) Inventors: Lei Feng, Shenzhen (CN); Yameng Wei, Shenzhen (CN); Wenxing Yao, Shenzhen (CN); Wei Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 253 days.

(21) Appl. No.: 18/263,975

(22) PCT Filed: Dec. 29, 2022

(86) PCT No.: PCT/CN2022/143268
§ 371 (c)(1),
(2) Date: Aug. 2, 2023

(87) PCT Pub. No.: WO2023/131041
PCT Pub. Date: Jul. 13, 2023

(65) Prior Publication Data
US 2024/0302870 A1    Sep. 12, 2024

(30) Foreign Application Priority Data

Jan. 10, 2022 (CN) .......................... 202210021087.5
Apr. 25, 2022 (CN) .......................... 202210437862.5

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC .. G06F 1/1681; G06F 1/1652; H04M 1/0268; H04M 1/022
See application file for complete search history.

(56) References Cited

U.S. PATENT DOCUMENTS 8,971,031 B2 *   3/2015   Mok .................... G06F 1/1656
                                                361/679.27
9,348,450 B1 *   5/2016   Kim .................... H04M 1/0268
(Continued)

FOREIGN PATENT DOCUMENTS

CN    208421695 U    1/2019
CN    209944867 U    1/2020
(Continued)

*Primary Examiner* — Rockshana D Chowdhury
(74) *Attorney, Agent, or Firm* — Slater Matsil, LLP

(57) ABSTRACT

This application provides a foldable assembly and an electronic device. The foldable assembly includes a first main swing arm, a first torsion swing arm, a first shaft, and a damping assembly. The first main swing arm is provided with a first sliding groove. The first sliding groove includes a first acceleration segment and a first gentle speed segment connected to each other. An absolute value of a slope of the first acceleration segment is greater than an absolute value of a slope of the first gentle speed segment. The first torsion swing arm includes a first end and a second end. The first shaft passes through the first end and the first sliding groove, and connects the first torsion swing arm and the first main swing arm. The damping assembly is rotatably connected to the second end.

14 Claims, 16 Drawing Sheets

(56) References Cited

U.S. PATENT DOCUMENTS

| | | | |
|---|---|---|---|
| 9,600,035 B2* | 3/2017 | Park | G06F 1/1681 |
| 9,848,502 B1* | 12/2017 | Chu | G06F 1/1681 |
| 10,761,574 B1* | 9/2020 | Hsu | G06F 1/1616 |
| 10,827,633 B2* | 11/2020 | Yoo | H05K 1/189 |
| 10,831,242 B1* | 11/2020 | He | H05K 5/0226 |
| 11,054,869 B2* | 7/2021 | Moon | G06F 1/1656 |
| 11,223,710 B2* | 1/2022 | Cheng | H04M 1/0268 |
| 11,336,759 B2* | 5/2022 | Liao | H04M 1/022 |
| 11,522,985 B1* | 12/2022 | Lim | G06F 1/1652 |
| 11,550,367 B2* | 1/2023 | Lin | G06F 1/1681 |
| 11,615,720 B2* | 3/2023 | Park | H04M 1/022 361/679.01 |
| 11,726,530 B2* | 8/2023 | Kang | H04B 1/3833 361/679.27 |
| 12,013,730 B2* | 6/2024 | Hsu | G06F 1/1652 |
| 12,058,276 B2* | 8/2024 | Jiang | H04M 1/022 |
| 12,093,087 B2* | 9/2024 | Liu | H04M 1/022 |
| 12,130,668 B2* | 10/2024 | Liu | G09F 9/301 |
| 12,173,541 B2* | 12/2024 | Chung | G06F 1/1681 |
| 12,235,688 B2* | 2/2025 | Lin | F16C 11/04 |
| 12,271,236 B2* | 4/2025 | Feng | H04M 1/022 |
| 12,274,014 B2* | 4/2025 | Li | H05K 5/0226 |
| 2015/0233162 A1* | 8/2015 | Lee | H04M 1/022 16/223 |
| 2021/0247815 A1* | 8/2021 | Shim | G06F 1/1641 |
| 2021/0368032 A1* | 11/2021 | Liao | G06F 1/1681 |
| 2022/0159109 A1* | 5/2022 | Kang | G06F 1/1616 |
| 2022/0263930 A1* | 8/2022 | Koh | H04M 1/022 |
| 2023/0209752 A1* | 6/2023 | Yun | H05K 5/0226 361/807 |
| 2023/0292455 A1* | 9/2023 | Caplow-Munro | H04M 1/022 |
| 2023/0296129 A1* | 9/2023 | Kim | G06F 1/1681 361/807 |
| 2024/0069604 A1* | 2/2024 | Xu | G06F 1/1652 |
| 2024/0111340 A1* | 4/2024 | Niu | G09F 9/301 |
| 2024/0302870 A1* | 9/2024 | Feng | H04M 1/022 |
| 2024/0384751 A1* | 11/2024 | Wu | F16C 11/04 |

FOREIGN PATENT DOCUMENTS

| | | |
|---|---|---|
| CN | 112087540 A | 12/2020 |
| CN | 112178041 A | 1/2021 |
| CN | 212840395 U | 3/2021 |
| CN | 112901643 A | 6/2021 |
| CN | 113315860 A | 8/2021 |
| CN | 113643612 A | 11/2021 |
| EP | 3095940 A1 | 11/2016 |
| EP | 4269825 B1 | 3/2025 |
| KR | 20160107940 A | 9/2016 |
| KR | 102311588 B1 | 10/2021 |
| WO | 2023131041 A1 | 7/2023 |

* cited by examiner

FOLDABLE ASSEMBLY AND ELECTRONIC DEVICE

CROSS-REFERENCE TO RELATED APPLICATIONS

This application is a national stage of International Application No. PCT/CN2022/143268, filed on Dec. 29, 2022, which claims priority to Chinese Patent Application No. 202210021087.5, filed on Jan. 10, 2022, and Chinese Patent Application No. 202210437862.5, filed on Apr. 25, 2022. The disclosures of each of the aforementioned applications are hereby incorporated by reference in their entireties.

TECHNICAL FIELD

This application relates to the technical field of foldable electronic devices, and in particular to a foldable assembly and an electronic device.

BACKGROUND

As flexible foldable screen technologies are increasingly mature, foldable terminal products have become a major trend. The foldable terminal products (such as foldable mobile phones, foldable tablets, and foldable computers) need to meet high reliability and good operating experience. To implement hovering of the foldable terminal product at different angles, a surface shape of a cam is usually to be changed. However, a change of the surface shape of the cam is likely to lead to reduction of service life of the cam. How to achieve hovering at a large angle while ensuring the service life of the cam is a subject to be continuously explored in the industry.

SUMMARY

Embodiments of this application provide a foldable assembly and an electronic device, to implement hovering at a large angle while ensuring service life of a cam.

According to a first aspect of this application, a foldable assembly is provided. The foldable assembly includes:
- a first main swing arm, where the first main swing arm is provided with a first sliding groove, the first sliding groove includes a first acceleration segment and a first gentle speed segment connected to each other, and an absolute value of a slope of the first acceleration segment is greater than an absolute value of a slope of the first gentle speed segment;
- a first torsion swing arm, where the first torsion swing arm includes a first end and a second end;
- a first shaft, where the first shaft passes through the first end and the first sliding groove, and connects the first torsion swing arm and the first main swing arm; and
- a damping assembly, where the damping assembly is connected to the second end, when the first torsion swing arm rotates relative to the damping assembly, the first shaft moves from the first acceleration segment to the first gentle speed segment, the damping assembly is changed from a first resistance state to a second resistance state, and a rotational resistance of the damping assembly in the second resistance state to the first torsion swing arm is greater than a rotational resistance of the damping assembly in the first resistance state to the first torsion swing arm.

It may be understood that, as the foldable assembly develops toward miniaturization, a size of a spring and a size of a cam in the damping assembly are greatly reduced, resulting in a small damping force provided by the foldable assembly. To ensure a proper damping force provided by the foldable assembly, a surface profile of the cam is to be changed, to increase a climbing amount and a climbing angle of the cam, and the damping force. However, a change of the surface profile of the cam shortens service life of the cam, leading to a failure of the foldable assembly.

Therefore, in embodiments of this application, the surface profile of the cam may be not changed to prolong the service life of the cam. A range of n angle at which hovering is further increased by only matching with different speeds between the first main swing arm and the first torsion swing arm, helping to implement hovering of the foldable assembly at a large angle. For example, a range of an angle at which the foldable assembly may be hovered in conventional technologies is 80° to 120°, and the range of an angle at which the foldable assembly may be hovered in the technical solution of this application may be 30° to 150°. Therefore, the range of an angle at which the foldable assembly may be hovered is further expanded compared with the range of an angle at which the foldable assembly may be hovered in conventional technologies. Matching with different speeds between the first main swing arm and the first torsion swing arm may be understood as a difference between a rotational angle of the first main swing arm and a rotational angle of the first torsion swing arm. For example, originally, as the first main swing arm is rotated by 1°, the first torsion swing arm is rotated by 1°, and in case of matching with different speeds, as the first main swing arm is rotated by 1°, the first torsion swing arm is rotated by 2°. Matching with different speeds between the main swing arm and the torsion swing arm is implemented by designing of the first sliding groove of the first main swing arm.

It may be understood that the first shaft can slide in the first acceleration segment and the first gentle speed segment. A sliding speed of the first shaft in the first acceleration segment and a sliding speed of the first shaft in the first gentle speed segment are related to the absolute value of the slope of the first acceleration segment and the absolute value of the slope of the first gentle speed segment respectively. Specifically, when the first shaft moves in a segment with a relatively large absolute value of a slope, a movement speed of the first shaft in the segment is relatively fast. Therefore, in this stage, an included angle between the first main swing arm and the second main swing arm is changed relatively fast. In this stage, the damping assembly is in the first resistance state, and the first torsion swing arm can rotate freely.

When the first shaft moves in a segment with a relatively small absolute value of a slope, a movement speed of the first shaft in the segment is relatively slow. Therefore, in this stage, an included angle between the first main swing arm and the second main swing arm is changed relatively slow. In this stage, the damping assembly is in the second resistance state, and the first torsion swing arm can rotate to an angle and stay at the angle.

That is, during folding of the foldable assembly, a range of a rotational angle of the foldable assembly corresponding to the first gentle speed segment is large, and a range of a rotational angle of the foldable assembly corresponding to the first acceleration segment is small, effectively prolonging a stage in which the foldable assembly is hovered with the greatest damping. In addition, because the stage in which the foldable assembly is hovered with the greatest damping is prolonged, a range of an angle at which the foldable assembly may be hovered may be further expanded, helping to implement hovering of the foldable assembly at a large angle.

Based on such disposing, a movement speed of the first torsion swing arm and a movement speed of the first main swing arm meet a relationship of matching with different speeds. This enables the damping assembly to be in the second resistance state as much as possible during rotation of the first main swing arm and helps to prolong the stage in which the foldable assembly may be hovered.

In a possible implementation, the first sliding groove further includes a second gentle speed segment and a second acceleration segment. One end of the second gentle speed segment is connected to the first gentle speed segment, and the other end of the second gentle speed segment is connected to the second acceleration segment. An absolute value of a slope of the second acceleration segment is greater than an absolute value of a slope of the second gentle speed segment, and the second gentle speed segment and the first gentle speed segment are rotationally symmetrical.

The first shaft moves from the first gentle speed segment to the second gentle speed segment. The damping assembly maintains the second resistance state. The first shaft moves from the second gentle speed segment to the second acceleration segment. The damping assembly is changed from the second resistance state to a third resistance state. A rotational resistance of the damping assembly in the second resistance state to the first torsion swing arm is greater than a rotational resistance of the damping assembly in the third resistance state to the first torsion swing arm.

The second gentle speed segment and the first gentle speed segment are rotationally symmetrical. That is, the first gentle speed segment can be rotated around a fixed point to be changed into the second gentle speed segment, and the second gentle speed segment can be rotated around the same fixed point to be changed into the first gentle speed segment.

It should be noted that, in this embodiment of this application, an angle at which the first gentle speed segment is rotated to be changed into the second gentle speed segment or an angle at which the second gentle speed segment is rotated to be changed into the first gentle speed segment is not strictly limited, and the angle may be any angle, for example, 170° or 180°, on the basis of meeting working requirements of the foldable assembly.

Therefore, due to rotationally symmetrical disposing of the first gentle speed segment and the second gentle speed segment, an absolute value of a slope at a joint of the first gentle speed segment and the second gentle speed segment changes slightly. A slight change of the absolute value of the slope can enable a speed at which the first shaft moves from an end of the first gentle speed segment to a start of the second gentle speed segment to change slightly, and further enable a speed at which the first shaft moves from the first gentle speed segment to the second gentle speed segment to change slightly.

It may be understood that the second shaft can slide in the second acceleration segment and the second gentle speed segment. A sliding speed of the second shaft in the second acceleration segment and a sliding speed of the second shaft in the second gentle speed segment are related to the absolute value of the slope of the second acceleration segment and the absolute value of the slope of the second gentle speed segment respectively. Specifically, when the second shaft moves in a segment with a relatively small absolute value of a slope, a movement speed of the second shaft in the segment is relatively slow. Therefore, in this stage, an included angle between the second main swing arm and the second main swing arm is changed relatively slow. In this stage, the damping assembly is in the second resistance state, and the second torsion swing arm can rotate to an angle and stay at the angle.

When the second shaft moves in a segment with a relatively large absolute value of a slope, a movement speed of the second shaft in the segment is relatively fast. Therefore, in this stage, an included angle between the second main swing arm and the second main swing arm is changed fast. In this stage, the damping assembly is in the third resistance state, and the second torsion swing arm can rotate freely.

That is, during folding of the foldable assembly, a range of a rotational angle of the foldable assembly corresponding to the second gentle speed segment is large, and a range of a rotational angle of the foldable assembly corresponding to the second acceleration segment is small, effectively prolonging a stage in which the foldable assembly is hovered with the greatest damping. In addition, because the stage in which the foldable assembly is hovered with the greatest damping is prolonged, a range of an angle at which the foldable assembly may be hovered may be further expanded, helping to implement hovering of the foldable assembly at a large angle. Based on such disposing, a movement speed of the first torsion swing arm and a movement speed of the first main swing arm meet a relationship of matching with different speeds. This enables the damping assembly to be in the second resistance state as much as possible during rotation of the first main swing arm and helps to prolong the stage in which the foldable assembly may be hovered.

In a possible implementation, a center of curvature of the first acceleration segment and a center of curvature of the second acceleration segment are located on two sides of the first sliding groove respectively.

That the center of curvature of the first acceleration segment and the center of curvature of the second acceleration segment are located on two sides of the first sliding groove respectively may be understood as that the center of curvature of the first acceleration segment and the center of curvature of the second acceleration segment are respectively located on one side of the first sliding groove and an opposite side of the first sliding groove with the first sliding groove as a reference object. In addition, the center of curvature of the first acceleration segment and the center of curvature of the first gentle speed segment are located on a same side of the first sliding groove, and the center of curvature of the second acceleration segment and the center of curvature of the second gentle speed segment are located on a same side of the first sliding groove.

In this implementation, the first gentle speed segment and the second gentle speed segment may be straight line segments, so that the first sliding groove presents a curve shape as a whole in which an arc segment and a straight line segment are mixed. Alternatively, the first gentle speed segment and the second gentle speed segment may be arc segments, so that the first sliding groove presents a curve shape as a whole that includes only arc segments.

In a possible implementation, the first acceleration segment and the second acceleration segment are both straight line segments.

In this implementation, the first gentle speed segment and the second gentle speed segment may be straight line segments, so that the first sliding groove presents a broken line shape as a whole that includes only straight line segments. Alternatively, the first gentle speed segment and the second gentle speed segment may be arc segments, so that the first sliding groove presents a curve shape as a whole in which an arc segment and a straight line segment are mixed.

In a possible implementation, the first acceleration segment and the second acceleration segment are rotationally symmetrical.

That is, the first acceleration segment can be rotated around a fixed point to be changed into the second acceleration segment, and the second acceleration segment can be rotated around the same fixed point to be changed into the first acceleration segment.

It should be noted that, in this embodiment of this application, an angle at which the first acceleration segment is rotated to be changed into the second acceleration segment or an angle at which the second acceleration segment is rotated to be changed into the first acceleration segment is not strictly limited, and the angle may be any angle, for example, 170° or 180°, on the basis of meeting working requirements of the foldable assembly.

Therefore, because the first acceleration segment and the second acceleration segment are rotationally symmetrical, and the first gentle speed segment and the second gentle speed segment are rotationally symmetrical, the first segment and the second segment may be rotationally symmetrical. In other words, the first segment can be rotated around a fixed point to be changed into the second segment, and the second segment can be rotated around the same fixed point to be changed into the first segment. By dividing of the structure of the first sliding groove into two segments, a speed stage of sliding movement of the first shaft in the first sliding groove may be in a symmetrically disposed shape because the first segment and the second segment are rotationally symmetrically disposed, and the symmetrical speed stage helps to prolong the stage in which the foldable assembly may be hovered.

It should be noted that, in this embodiment of this application, an angle at which the first segment is rotated to be changed into the second segment or an angle at which the second segment is rotated to be changed into the first segment is not strictly limited, and the angle may be any angle, for example, 170° or 180°, on the basis of meeting working requirements of the foldable assembly.

In a possible implementation, a center of curvature of the first gentle speed segment and a center of curvature of the second gentle speed segment are located on two sides of the first sliding groove respectively.

That the center of curvature of the first gentle speed segment and the center of curvature of the second gentle speed segment are located on two sides of the first sliding groove respectively may be understood as that the center of curvature of the first gentle speed segment and the center of curvature of the second gentle speed segment are respectively located on one side of the first sliding groove and an opposite side of the first sliding groove with the first sliding groove as a reference object. Based on such disposing, the first gentle speed segment and the second gentle speed segment can jointly form a curve segment of a different shape (for example, a wave shape or an S shape) based on a difference between a rotational angle of the first gentle speed segment and a rotational angle of the second gentle speed segment. Such disposing is flexible.

In a possible implementation, the center of curvature of the first gentle speed segment and the center of curvature of the first acceleration segment are located on a same side of the first sliding groove, and the center of curvature of the second gentle speed segment and the center of curvature of the second acceleration segment are located on a same side of the first sliding groove.

In a possible implementation, the first gentle speed segment and the second gentle speed segment are both straight line segments.

Based on such disposing, the first gentle speed segment and the second gentle speed segment can jointly form a straight line segment shape or a broken line segment shape based on a difference between a rotational angle of the first gentle speed segment and a rotational angle of the second gentle speed segment. Such disposing is flexible.

In a possible implementation, the foldable assembly further includes a first rotating shaft. The first rotating shaft passes through the second end. The damping assembly includes a first cam structure, a second cam structure, a first elastic member, and a limiting member.

The first cam structure is fixed to the second end and sleeved on the first rotating shaft. The second cam structure is sleeved on the first rotating shaft and contacts the first cam structure. The limiting member is fixed to the first rotating shaft. The first elastic member abuts between the second cam structure and the limiting member. The second cam structure is capable of moving along the first rotating shaft when pushed by the first cam structure, to compress or release the first elastic member.

It may be understood that the first cam structure cannot move axially along the first rotating shaft, only the second cam structure has space for axial movement, and the first cam structure and the second cam structure always match each other and contact each other well. Therefore, when the first cam structure rotates, the second cam structure is pushed by the first cam structure to move axially along the first rotating shaft, to compress the first elastic member or release compression of the first elastic member, increasing a damping effect and improving user experience of the user during folding.

During rotation of the first torsion swing arm relative to the base, the first cam structure disposed at the second end of the first torsion swing arm moves relative to the second cam structure. Relative movement may be understood as that the second cam structure is squeezed and slides relative to the first cam structure. This enables an axial distance between the second cam structure and the first cam structure to be changed. Further, the first elastic member is compressed, and the first elastic member squeezes the first cam structure by using the second cam structure, generating a resistance to rotation of the first cam structure and forming a damping force. When the damping force formed by the first elastic member can prevent the first torsion swing arm and the second torsion swing arm from rotating freely under the action of gravity, the first torsion swing arm may stop at any angle, so that the foldable assembly is hovered at any angle.

According to a second aspect, this application further provides a foldable assembly. The foldable assembly includes:

a first main swing arm, where the first main swing arm is provided with a first sliding groove, the first sliding groove includes a first acceleration segment and a first gentle speed segment connected to each other, and an absolute value of a slope of the first acceleration segment is greater than an absolute value of a slope of the first gentle speed segment;

a first torsion swing arm, where the first torsion swing arm includes a first end and a second end;

a first shaft, where the first shaft passes through the first end and the first sliding groove, the first shaft connects the first torsion swing arm and the first main swing arm, and the first shaft is capable of sliding in the first sliding groove;

a first rotating shaft, where the first rotating shaft passes through the second end; and a damping assembly, where the damping assembly includes a first cam structure, a second cam structure, a first elastic member, and a limiting member, the first cam structure is fixed to the second end and sleeved on the first rotating shaft, the second cam structure is sleeved on the first rotating shaft and contacts the first cam structure, the first elastic member elastically abuts between the second cam structure and the limiting member, and the second cam structure is capable of moving along the first rotating shaft when pushed by the first cam structure, to compress or release the first elastic member.

In a possible implementation, the first sliding groove further includes a second gentle speed segment and a second acceleration segment. One end of the second gentle speed segment is connected to the first gentle speed segment, and the other end of the second gentle speed segment is connected to the second acceleration segment. An absolute value of a slope of the second acceleration segment is greater than an absolute value of a slope of the second gentle speed segment, and the second gentle speed segment and the first gentle speed segment are rotationally symmetrical.

In a possible implementation, a center of curvature of the first acceleration segment and a center of curvature of the second acceleration segment are located on two sides of the first sliding groove respectively.

According to a third aspect, this application further provides an electronic device. The electronic device includes a flexible display and the foregoing foldable assembly. The flexible display is disposed on the foldable assembly.

DETAILED DESCRIPTION OF ILLUSTRATIVE EMBODIMENTS

For ease of understanding, terms in embodiments of this application are first explained.

A term "and/or" describes only an association relationship between associated objects and indicates that three relationships exist. For example, A and/or B may represent the following three cases: Only A exists, both A and B exist, and only B exists.

"A plurality of" means "two or more".

Connection: It should be understood in a broad sense. For example, if A is connected to B, A may be directly connected to B, or A and B may be indirectly connected through an intermediate medium.

The following clearly describes specific implementations of this application with reference to accompanying drawings.

Embodiments of this application provide a foldable assembly and an electronic device using the foldable assembly.

The electronic device may be a foldable device, and can be unfolded and folded by a user. In embodiments of this application, for ease of understanding, a mobile phone that is widely used by a user in various application scenarios is used as an example for description, but the electronic device is not limited to the mobile phone.

Figure 1:
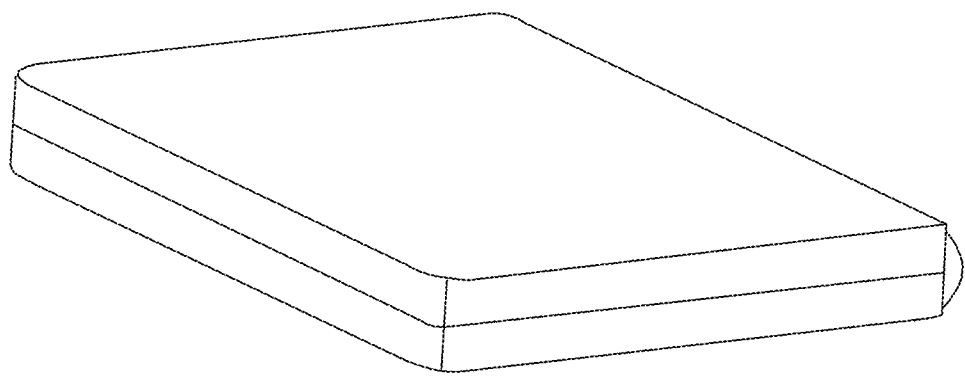
FIG. 1 is a simple schematic diagram of a structure of an electronic device in a folded state according to an embodiment of this application.
Figure 2:
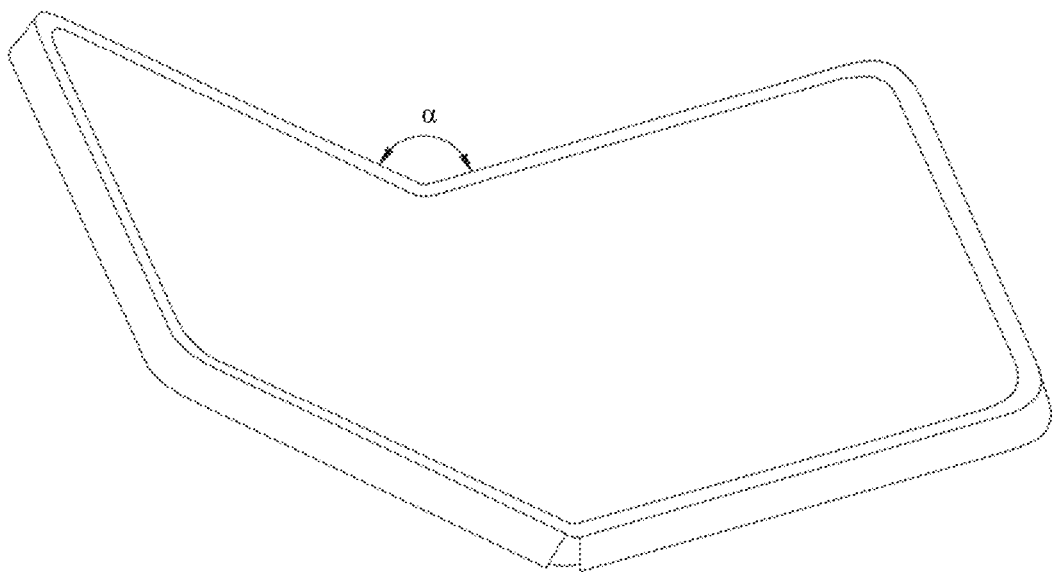
FIG. 2 is a simple schematic diagram of a structure of the electronic device shown in FIG. 1 in an intermediate state.
Figure 3:
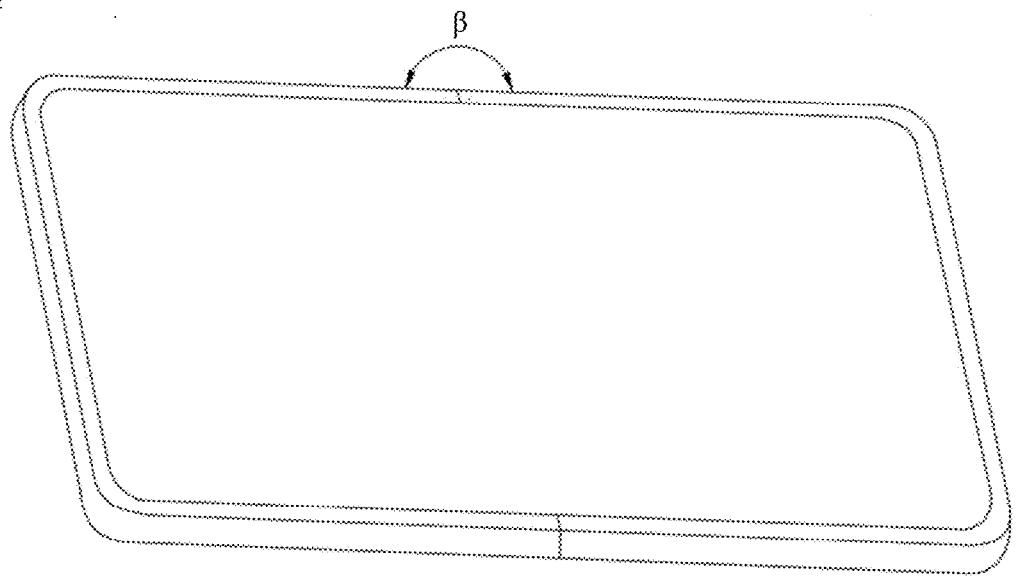
FIG. 3 is a simple schematic diagram of a structure of the electronic device shown in FIG. 1 in an unfolded state.

FIG. 1 is a simple schematic diagram of a structure of an electronic device 200 in a folded state according to an embodiment of this application. FIG. 2 is a simple schematic diagram of a structure of the electronic device 200 shown in FIG. 1 in an intermediate state. An unfolding angle α of the electronic device 200 is 120°, where α may alternatively be another angle. FIG. 3 is a simple schematic diagram of a structure of the electronic device 200 shown in FIG. 1 in an unfolded state. An unfolding angle β of the electronic device 200 is 180°, where β may alternatively be another angle.

It should be noted that, the angles illustrated are all allowed to have a slight deviation. For example, that the unfolding angle α of the electronic device 200 shown in FIG. 3 is 120° means that α may be 120° or approximately 120°, such as 115° or 125°. That the unfolding angle β of the electronic device 200 shown in FIG. 4 is 180° means that β may be 180° or approximately 180°, such as 185° or 190°.

As shown in FIG. 1 to FIG. 3, a left part and a right part of the electronic device 200 can rotate left and right, so that the electronic device 200 can be folded and unfolded. Folding and unfolding of the electronic device 200 affect a width value of the electronic device 200. It should be understood that division of the electronic device is not limited to FIG. 1 to FIG. 3, and the electronic device 200 may be alternatively divided into an upper part and a lower part. The upper part and the lower part may be rotated up and down, so that the electronic device 200 can be folded and unfolded. Folding and unfolding of the electronic device 200 affect a length value of the electronic device 200, which is not described in detail herein.

Figure 4:
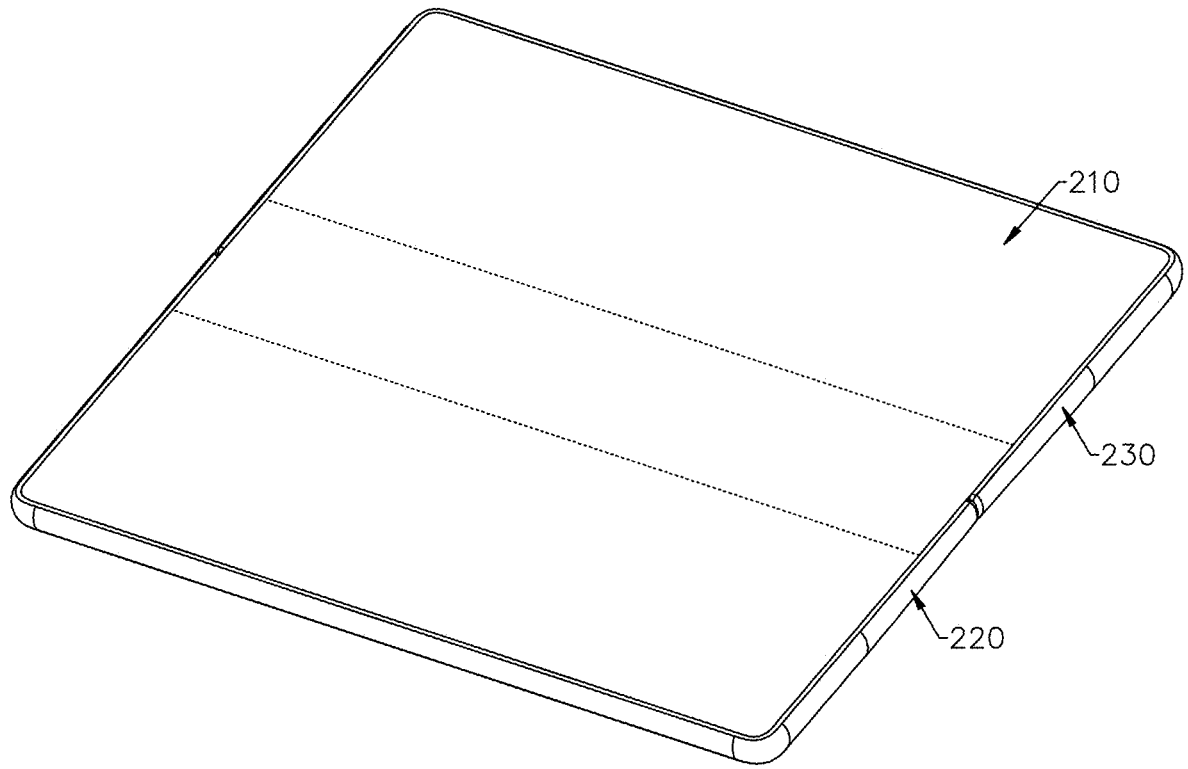
FIG. 4 is a schematic diagram of a structure of an electronic device according to an embodiment of this application.
Figure 5:
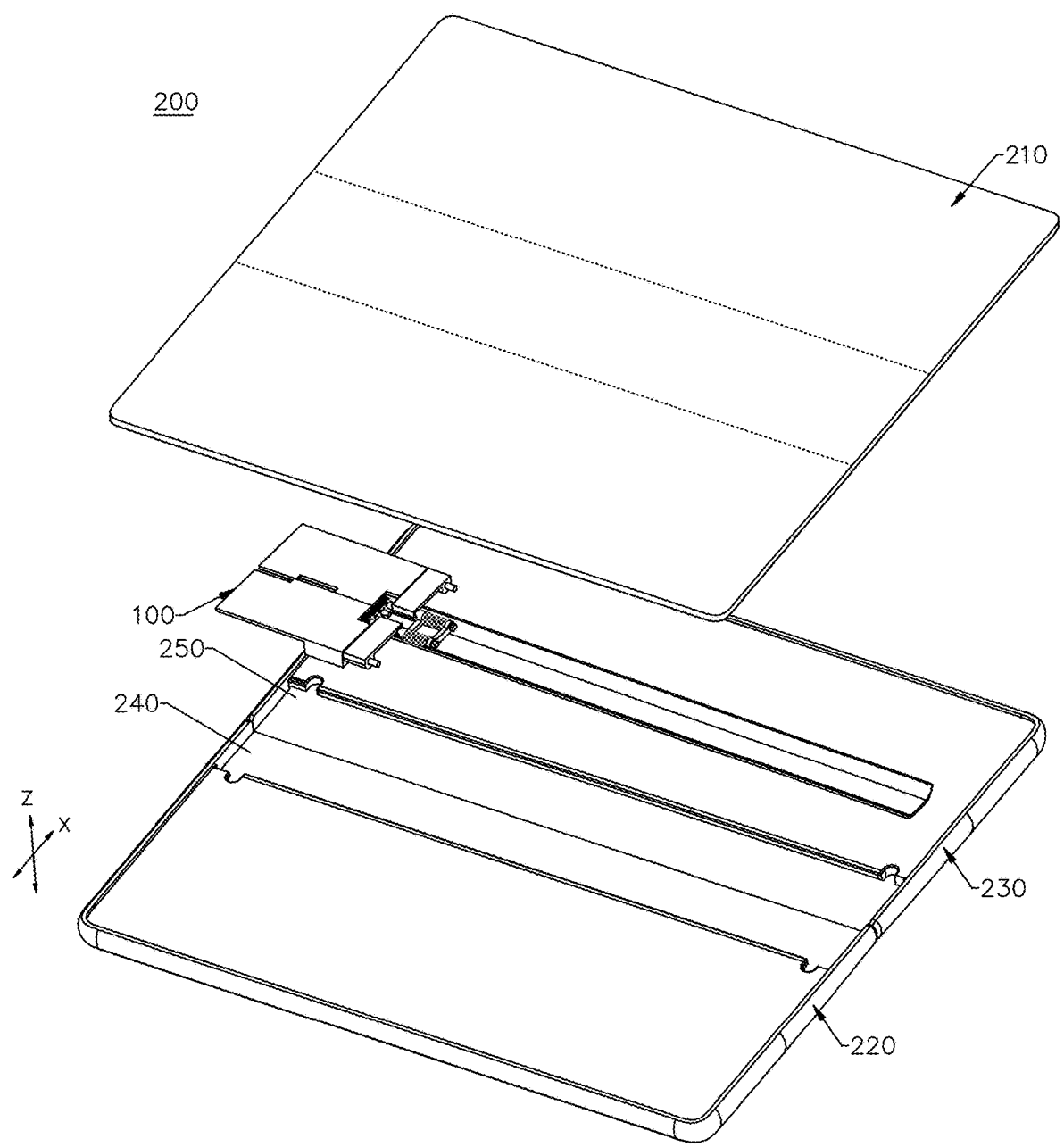
FIG. 5 is a schematic exploded view of the electronic device shown in FIG. 4.

FIG. 4 is a schematic diagram of a structure of an electronic device 200 according to an embodiment of this application. FIG. 5 is a schematic exploded view of the electronic device 200 shown in FIG. 4. With reference to FIG. 4 and FIG. 5, the electronic device 200 includes a flexible display 210, a first housing 220, a second housing 230, and a foldable assembly 100.

It should be noted that FIG. 4 and FIG. 5 are only intended to schematically describe a connection relationship between the flexible display 210, the first housing 220, the second housing 230, and the foldable assembly 100, and are not to specifically limit connection positions, specific structures, and quantities of the devices. The structure shown in this embodiment of this application does not constitute a specific limitation on the electronic device 200. In some other embodiments of this application, the electronic device 200 may include more or fewer components than those shown in the figure, combine some components, split some components, or have a different component arrangement. The components shown in the figure may be implemented in hardware, software, or a combination of software and hardware.

The first housing 220 and the second housing 230 may be independent housing structures capable of jointly bearing the flexible display 210. The first housing 220 is provided with a first mounting groove 240, and the second housing 230 is provided with a second mounting groove 250. The first mounting groove 240 and the second mounting groove 250 are connected to form a mounting groove. The foldable assembly 100 is mounted at the mounting groove and is fixed to the first housing 220 and the second housing 230, to achieve rotatable connection between the first housing 220 and the second housing 230. The first housing 220 and the second housing 230 may rotate relative to each other by using the foldable assembly 100, so that the foldable assembly 100 is switched between a folded state and an unfolded state. The first housing 220 and the second housing 230 are also provided with accommodating grooves (not shown). The accommodating grooves are configured to accommodate electronic elements and structural elements such as a processor, a circuit board, and a camera module of the electronic device 200.

The foldable assembly 100 is connected between the first housing 220 and the second housing 230. The foldable assembly 100 may enable the first housing 220 and the second housing 230 to be unfolded relative to each other to an unfolded state, enable the first housing 220 and the second housing 230 to be folded relative to each other to a folded state, or enable the first housing 220 and the second housing 230 to be in an intermediate state between the unfolded state and the folded state, achieving folding performance of the electronic device 200.

The flexible display 210 is disposed on the first housing 220, the second housing 230, and the foldable assembly 100, and can be configured to display information and provide an interactive interface for a user. The flexible display 210 may be unfolded with relative unfolding of the first housing 220 and the second housing 230, and folded with relative folding of the first housing 220 and the second housing 230. For example, the flexible display 210 may be an organic light-emitting diode (organic light-emitting diode, OLED) display, an active-matrix organic light-emitting diode (active-matrix organic light-emitting diode, AMOLED) display, a mini light-emitting diode (mini organic light-emitting diode) display, a micro light-emitting diode (micro organic light-emitting diode) display, a micro organic light-emitting diode (micro organic light-emitting diode) display, or a quantum dot light-emitting diode (quantum dot light-emitting diode, QLED) display. The flexible display 210 may be fixed to the first housing 220, the second housing 230, and the foldable assembly 100 by adhesive dispensing.

Specifically, the first housing 220 and the second housing 230 may be unfolded relative to each other to the unfolded state, so that the electronic device 200 is in the unfolded state. When the electronic device 200 is in the unfolded state, the flexible display 210 is unfolded and is in an unfolded state. This can expand a display area of the electronic device 200. In this case, the flexible display 210 can display in full screen. Therefore, the electronic device 200 has a large display area, and can present an effect of large-screen display and improve user experience. For example, when the first housing 220 and the second housing 230 are in the unfolded state, an included angle between the first housing 220 and the second housing 230 may be approximately 180° (a little deviation allowed, for example, 175°, 178°, or 185°).

The first housing 220 and the second housing 230 may alternatively be folded to a folded state, so that the electronic device 200 is in a folded state. When the electronic device 200 is in the folded state, a plane size of the electronic device 200 is small, so that the electronic device 200 can be stored and carried easily by the user. For example, when the first housing 220 and the second housing 230 are in the folded state, the first housing 220 and the second housing 230 can be completely folded to be parallel to each other (with a little deviation allowed).

The first housing 220 and the second housing 230 may also be rotated relative to each other, to be close to each other (folded relative to each other) or far away from each other (unfolded relative to each other) to the intermediate state, so that the electronic device 200 is in an intermediate state. The intermediate state may be any state between the unfolded state and the folded state. For example, when the first housing 220 and the second housing 230 are in the intermediate state, an included angle between the first housing 220 and the second housing 230 may be 135°, 90°, or 45°.

For example, the flexible display 210 of the electronic device 200 may be folded inward by using the foldable assembly 100. In this case, the flexible display 210 may be sandwiched between the first housing 220 and the second housing 230. That is, the flexible display 210 may be located inside the first housing 220 and the second housing 230, to present a state of being wrapped by the first housing 220 and the second housing 230. Alternatively, the flexible display 210 of the electronic device 200 may be folded outward by using the foldable assembly 100. In this case, the flexible display 210 assembly may be exposed outside as an external structure of the electronic device 200. That is, the flexible display 210 may be located outside the first housing 220 and the second housing 230, to present a state of wrapping the first housing 220 and the second housing 230.

It should be noted that when the electronic device 200 is in the unfolded state, the foldable assembly 100 is also in the unfolded state. When the electronic device 200 is in the intermediate state, the foldable assembly 100 is also in the intermediate state. When the electronic device 200 is in the folded state, the foldable assembly 100 is also in the folded state.

Therefore, the first housing 220 and the second housing 230 may be unfolded and folded relative to each other by using the foldable assembly 100, so that the electronic device 200 is switched between the unfolded state and the folded state.

Figure 6:
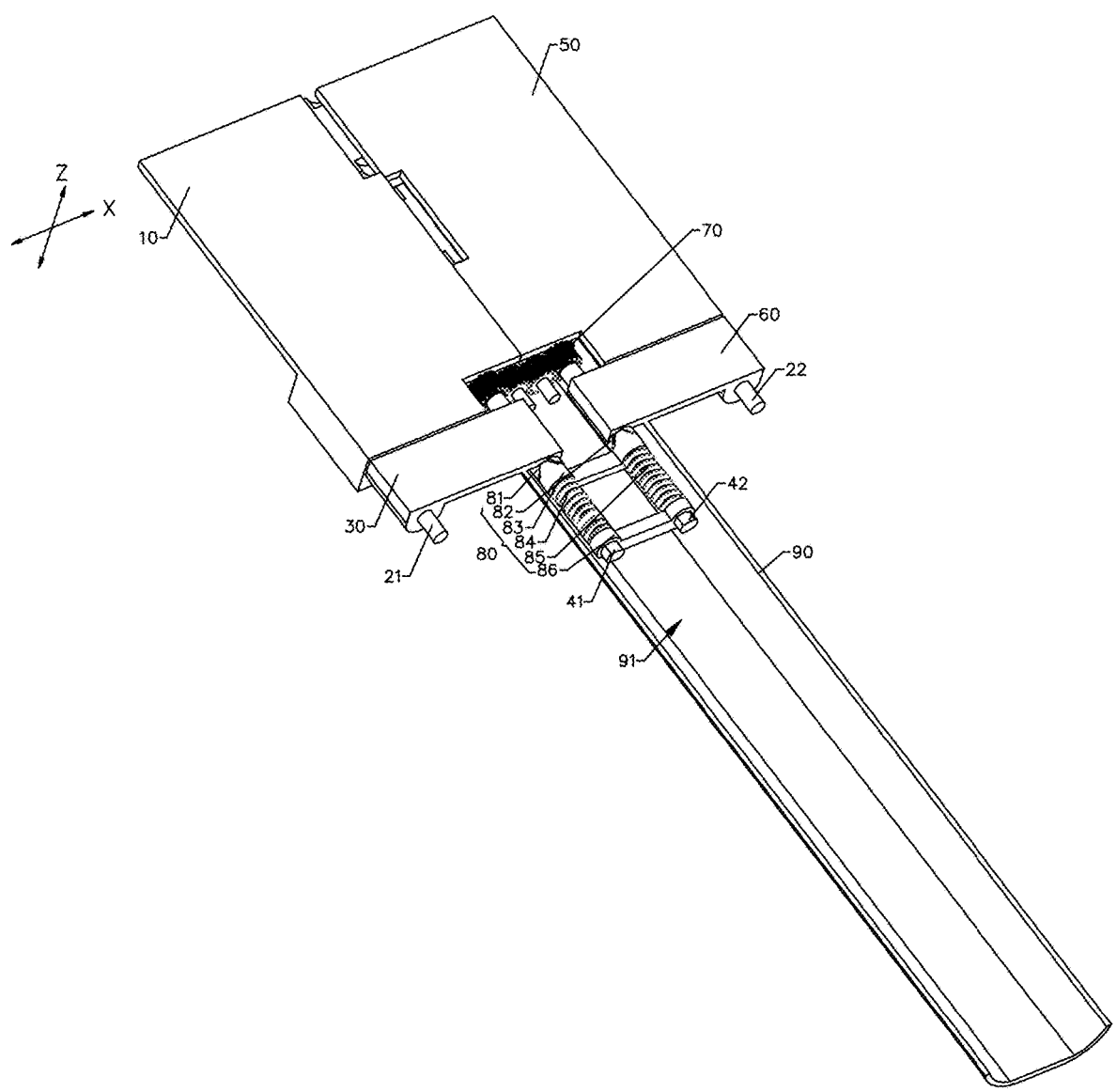
FIG. 6 is a schematic diagram of a part of a structure of a foldable assembly shown in FIG. 5.
Figure 7:
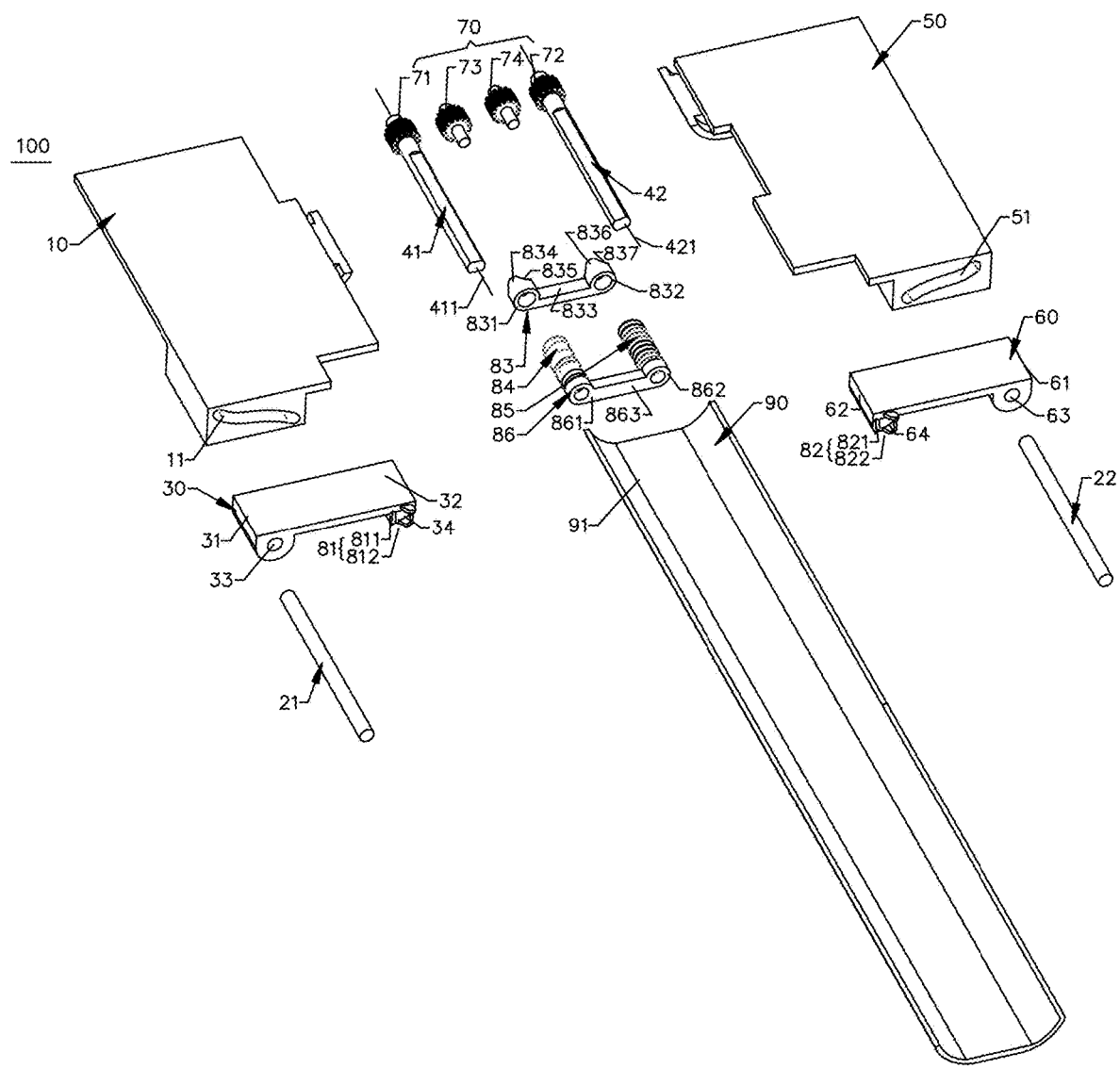
FIG. 7 is a schematic exploded view of the part of the structure of the foldable assembly shown in FIG. 6.

FIG. 6 is a schematic diagram of a part of a structure of the foldable assembly 100 shown in FIG. 5. FIG. 7 is a schematic exploded view of the part of the structure of the foldable assembly 100 shown in FIG. 6.

With reference to FIG. 6 and FIG. 7, the foldable assembly 100 includes a first main swing arm 10, a first shaft 21, a first torsion swing arm 30, a first rotating shaft 41, a second main swing arm 50, a second shaft 22, a second torsion swing arm 60, a second rotating shaft 42, a synchronizing mechanism 70, a damping assembly 80, and a base 90.

For example, the first main swing arm 10 and the second main swing arm 50 are symmetrically distributed on two sides of the base 90, the first torsion swing arm 30 and the second torsion swing arm 60 are symmetrically distributed on two sides of the base 90, and the first housing 220 and the second housing 230 are symmetrically distributed on two sides of the base 90. However, it should be understood that symmetrical distribution means symmetrical distribution in positions, and does not mean that shapes and structures of the two main swing arms, the two torsion swing arms, and the two housings are completely the same respectively. Structures of the two main swing arms, the two torsion swing arms, and the two housings may be the same or different, which is not strictly limited in embodiments of this application.

The base 90 can maintain a static state during relative folding and unfolding of the first main swing arm 10 and the second main swing arm 50. In other words, during relative folding and unfolding of the first main swing arm 10 and the second main swing arm 50, the base 90 can keep a position of the base 90 unchanged. That is, the base 90 is relatively stationary, and both the first main swing arm 10 and the second main swing arm 50 may rotate relative to the base 90.

There is accommodating space 91 in the base 90. The accommodating space 91 may be used for accommodating at least some parts of the foldable assembly 100 and other structures in the electronic device 200. For example, the synchronizing mechanism 70 and the damping assembly 80 may be disposed in the accommodating space 91 of the base 90, and the base 90 may be configured to accommodate the synchronizing mechanism 70 and the damping assembly 80.

The first main swing arm 10 is connected to the first housing 220 and can move together with the first housing 220. That is, when the first main swing arm 10 rotates relative to the base 90, the first housing 220 is driven to rotate synchronously relative to the base 90. When the first housing 220 rotates relative to the base 90, the first main swing arm 10 is driven to rotate synchronously relative to the base 90. The first main swing arm 10 is provided with a first sliding groove 11. The first shaft 21 can slide in the first sliding groove 11.

The first shaft 21 passes through the first torsion swing arm 30, and two ends of the first shaft 21 extend out of the first torsion swing arm 30. One end, extending out of the first torsion swing arm 30, of the first shaft 21 may be slidably connected to the first sliding groove 11. Therefore, the first torsion swing arm 30 may be connected to the first main swing arm 10 through the first shaft 21, and the first torsion swing arm 30 and the first main swing arm 10 may be linked by sliding of the first shaft 21 in the first sliding groove 11. In other words, when the first torsion swing arm 30 rotates relative to the base 90, the first main swing arm 10 is driven to rotate synchronously relative to the base 90. Alternatively, when the first main swing arm 10 rotates relative to the base 90, the first torsion swing arm 30 is driven to rotate synchronously relative to the base 90.

The first torsion swing arm 30 includes a first end 31 and a second end 32. The first end 31 of the first torsion swing arm 30 is an end at which the first torsion swing arm 30 is connected to the first main swing arm 10. The second end 32 of the first torsion swing arm 30 is an end at which the first torsion swing arm 30 is connected to the first rotating shaft 41, the synchronizing mechanism 70, and the damping assembly 80. Specifically, the first end 31 of the first torsion swing arm 30 may be provided with a first through hole 33 through which the first shaft 21 can pass. An aperture size of the first through hole 33 may be matched with an outer diameter size of the first shaft 21, so that the first shaft 21 passes through the first through hole 33. In other words, the first shaft 21 passes through the first end 31 and the first sliding groove 11, and connects the first torsion swing arm 30 and the first main swing arm 10. The second end 32 of the first torsion swing arm 30 may be provided with a second through hole 34 through which the first rotating shaft 41 can pass. An aperture size of the second through hole 34 may be matched with an outer diameter size of the first rotating shaft 41, so that the first rotating shaft 41 passes through the second through hole 34.

The first rotating shaft 41 passes through the second end 32 of the first torsion swing arm 30. The first rotating shaft 41 has a first axis 411. The first axis 411 is a rotation center of the first rotating shaft 41. The first rotating shaft 41 can rotate around the first axis 411. The first rotating shaft 41 can rotate synchronously with the first torsion swing arm 30. That is, during rotation around the first axis 411, the first rotating shaft 41 may drive, through rotation of the first rotating shaft 41, the first torsion swing arm 30 to rotate. In addition, because the first torsion swing arm 30 is linked with the first main swing arm 10 through the first shaft 21, the first torsion swing arm 30 can drive the first main swing arm 10 to rotate. Two ends of the first rotating shaft 41 extend out of the first torsion swing arm 30. One end, extending out of the first torsion swing arm 30, of the first rotating shaft 41 is connected to the synchronizing mechanism 70. The other end, extending out of the first torsion swing arm 30, of the first rotating shaft 41 is connected to the damping assembly 80.

The second main swing arm 50 is connected to the second housing 230 and can move together with the second housing 230. That is, when the second main swing arm 50 rotates relative to the base 90, the second housing 230 is driven to rotate synchronously relative to the base 90. When the second housing 230 rotates relative to the base 90, the second main swing arm 50 is driven to rotate synchronously relative to the base 90. The second main swing arm 50 is provided with a second sliding groove 51. The second shaft 22 can slide in the second sliding groove 51.

The second shaft 22 passes through the second torsion swing arm 60. Two ends of the second shaft 22 extend out of the second torsion swing arm 60. One end, extending out of the second torsion swing arm 60, of the second shaft 22 may be slidably connected to the second sliding groove 51. Therefore, the second torsion swing arm 60 may be connected to the second main swing arm 50 through the second shaft 22, and the second torsion swing arm 60 and the second main swing arm 50 may be linked by sliding of the second shaft 22 in the second sliding groove 51. In other words, when the second torsion swing arm 60 rotates relative to the base 90, the second main swing arm 50 is driven to rotate synchronously relative to the base 90. Alternatively, when the second main swing arm 50 rotates relative to the base 90, the second torsion swing arm 60 is driven to rotate synchronously relative to the base 90.

The second torsion swing arm 60 includes a third end 61 and a fourth end 62. The third end 61 of the second torsion swing arm 60 is an end at which the second torsion swing arm 60 is connected to the second main swing arm 50. The fourth end 62 of the second torsion swing arm 60 is an end at which the second torsion swing arm 60 is connected to the second rotating shaft 42, the synchronizing mechanism 70, and the damping assembly 80. Specifically, the third end 61 of the second torsion swing arm 60 may be provided with a third through hole 63 through which the second shaft 22 can pass. An aperture size of the third through hole 63 may be matched with an outer diameter size of the second shaft 22, so that the second shaft 22 passes through the third through hole 63. In other words, the second shaft 22 passes through the third end 61 and the second sliding groove 51, and is connected to the second torsion swing arm 60 and the second main swing arm 50. The fourth end 62 of the second torsion swing arm 60 may be provided with a fourth through hole 64 through which the second rotating shaft 42 can pass. An aperture size of the fourth through hole 64 may be matched with an outer diameter size of the second rotating shaft 42, so that the second rotating shaft 42 passes through the fourth through hole 64.

The second rotating shaft 42 passes through the fourth end 62 of the second torsion swing arm 60. The second rotating shaft 42 has a second axis 421. The second axis 421 is a rotation center of the second rotating shaft 42. The second rotating shaft 42 can rotate around the second axis 421. The second rotating shaft 42 can rotate synchronously with the second torsion swing arm 60. That is, during rotation around the second axis 421, the second rotating shaft 42 may drive, through rotation of the second rotating shaft 42, the second torsion swing arm 60 to rotate. In addition, because the second torsion swing arm 60 is linked with the second main swing arm 50 through the second shaft 22, the second torsion swing arm 60 can drive the second main swing arm 50 to rotate. Two ends of the second rotating shaft 42 extend out of the second torsion swing arm 60. One end, extending out of the second torsion swing arm 60, of the second rotating shaft 42 is connected to the synchronizing mechanism 70. The other end, extending out of the second torsion swing arm 60, of the second rotating shaft 42 is connected to the damping assembly 80.

With reference to FIG. 6 and FIG. 7, the synchronizing mechanism 70 may include a first rotating gear 71, a second rotating gear 72, a first synchronizing gear 73, and a second synchronizing gear 74. The first rotating gear 71 is disposed at one end of the first rotating shaft 41, and the first rotating shaft 41 and the first rotating gear 71 may form a gear shaft structure, so that the first rotating shaft 41 and the first rotating gear 71 can rotate synchronously. The second rotating gear 72 is disposed at one end of the second rotating shaft 42, and the second rotating shaft 42 and the second rotating gear 72 may also form a gear shaft structure, so that the second rotating shaft 42 and the second rotating gear 72 can rotate synchronously. The first synchronizing gear 73 meshes with the first rotating gear 71, the second synchronizing gear 74 meshes with the second rotating gear 72, and the first synchronizing gear 73 meshes with the second synchronizing gear 74. Therefore, due to the meshing relationship, when one rotates, the other can rotate synchronously. Therefore, folding and unfolding of the first torsion swing arm 30 and the second torsion swing arm 60 may be implemented. In other words, folding and unfolding of the first main swing arm 10 and the second main swing arm 50 may be implemented, and folding and unfolding of the electronic device 200 are implemented.

The damping assembly 80 and the synchronizing mechanism 70 may be disposed on two sides of the first torsion swing arm 30 and the second torsion swing arm 60 respectively, to prevent mutual interference. The damping assembly 80 can implement that the first torsion swing arm 30 can stay at an angle after being rotated to the angle and the second torsion swing arm 60 can stay at an angle after being rotated to the angle, to assist in maintaining the angle of the first main swing arm 10 and the angle of the second main swing arm 50. In other words, the damping assembly 80 can implement slow descending when two housings (the first housing 220 and the second housing 230) are turned relative to each other. That is, the electronic device 200 may be positioned at any angle based on use requirements during folding or unfolding.

The damping assembly 80 has a first resistance state, a second resistance state, and a third resistance state. When the damping assembly 80 is in the first resistance state and the third resistance state, the first torsion swing arm 30 and the second torsion swing arm 60 can rotate freely relative to each other. When the damping assembly 80 is in the second resistance state, the first torsion swing arm 30 and the second torsion swing arm 60 may rotate relative to each other to an angle and stay at the angle.

A rotational resistance of the damping assembly 80 in the second resistance state to the first torsion swing arm 30 and the second torsion swing arm 60 is greater than a rotational resistance of the damping assembly 80 in the first resistance state to the first torsion swing arm 30 and the second torsion swing arm 60. A rotational resistance of the damping assembly 80 in the third resistance state to the first torsion swing arm 30 and the second torsion swing arm 60 is greater than a rotational resistance of the damping assembly 80 in the first resistance state to the first torsion swing arm and the second torsion swing arm.

The damping assembly 80 may include a first cam structure 81, a third cam structure 82, a sliding member 83, a first elastic member 84, a second elastic member 85, and a limiting member 86.

With reference to FIG. 6 and FIG. 7, the first cam structure 81 is disposed at a second end 32 of the first torsion swing arm 30. The first cam structure 81 has a hollow structure, and the first cam structure 81 is sleeved on the first rotating shaft 41 through the hollow structure. The first cam structure 81 includes a plurality of first convex parts 811 and a plurality of first concave parts 812. Every two adjacent first convex parts 811 are connected by one first concave part 812, so that the first cam structure 81 can present an uneven shape. For example, the first convex part 811 may present a nearly trapezoidal shape.

The third cam structure 82 is disposed at the fourth end 62 of the second torsion swing arm 60. The third cam structure 82 has a hollow structure, and the third cam structure 82 is sleeved on the second rotating shaft 42 through the hollow structure. The third cam structure 82 includes a plurality of third convex parts 821 and a plurality of third concave parts 822. Every two adjacent third convex parts 821 are connected by a third concave part 822, so that a sliding cam can present an uneven shape. For example, the third convex part 821 may present a nearly trapezoidal shape.

The sliding member 83 is slidably connected to the first rotating shaft 41 and the second rotating shaft 42. In other words, the sliding member 83 can slide relative to the first rotating shaft 41 and the second rotating shaft 42. In other words, the sliding member 83 can move along an axial direction of the first rotating shaft 41 on the first rotating shaft 41, and can also move along an axial direction of the second rotating shaft 42 on the second rotating shaft 42. The sliding member 83 includes a second cam structure 831, a fourth cam structure 832, and a first connecting part 833.

The second cam structure 831 has a hollow structure and is sleeved on the first rotating shaft 41 through the hollow structure. In addition, the second cam structure 831 can move on the first rotating shaft 41 along the axial direction of the first rotating shaft 41. In other words, the second cam structure 831 is slidably connected to the first rotating shaft 41. A plurality of second convex parts 834 and a plurality of second concave parts 835 are disposed on a side, facing the first torsion swing arm 30, of the second cam structure 831. Every two adjacent second convex parts 834 are connected by one second concave part 835, so that the second cam structure 831 of the sliding member 83 can present an uneven shape.

It may be understood that the second cam structure 831 always contact the first cam structure 81 by abutting. The contact between the second cam structure 831 and the first cam structure 81 may include contact between the first convex part 811 of the first cam structure 81 and the second concave part 835 of the second cam structure 831, or contact between the first concave part 812 of the first cam structure 81 and the second convex part 834 of the second cam structure 831, which is similar to meshing between teeth. The contact may alternatively include contact between the first convex part 811 of the first cam structure 81 and the second convex part 834 of the second cam structure 831.

The fourth cam structure 832 has a hollow structure and is sleeved on the second rotating shaft 42 through the hollow structure. In addition, the fourth cam structure 832 can move on the second rotating shaft 42 along the axial direction of the second rotating shaft 42. In other words, the fourth cam structure 832 is slidably connected to the second rotating shaft 42. A plurality of fourth convex parts 836 and a plurality of fourth concave parts 837 are disposed on a side, facing the second torsion swing arm 60, of the fourth cam structure 832. Every two adjacent fourth convex parts 836 are connected by one fourth concave part 837, so that the fourth cam structure 832 of the sliding member 83 can present an uneven shape.

It may be understood that the fourth cam structure 832 always contacts the third cam structure 82 by abutting. The contact between the fourth cam structure 832 and the third cam structure 82 may include contact between the third convex part 821 of the third cam structure 82 and the fourth concave part 837 of the fourth cam structure 832, or contact between the third concave part 822 of the third cam structure 82 and the fourth convex part 836 of the fourth cam structure 832, which is similar to meshing between teeth. The contact may alternatively include contact between the third convex part 821 of the third cam structure 82 and the fourth convex part 836 of the fourth cam structure 832.

The first connecting part 833 is connected between the second cam structure 831 and the fourth cam structure 832, and is located in a gap between the first rotating shaft 41 and the second rotating shaft 42, and can connect movement of the second cam structure 831 and the fourth cam structure 832 in series, so that the second cam structure 831 and the fourth cam structure 832 can move jointly.

The first elastic member 84 is sleeved on the first rotating shaft 41 and abuts against the second cam structure 831 of the sliding member 83. For example, the first elastic member 84 may be an elastic body with an elastic recovery force such as a spring or a disc spring group. Therefore, due to a good elastic force of the first elastic member 84, the second cam structure 831 may be pushed to enable the second cam structure 831 to contact the first cam structure 81 by abutting, ensuring a damping effect achieved by the first cam structure 81 and the second cam structure 831.

It may be understood that the first cam structure 81 cannot move axially along the first rotating shaft 41, only the second cam structure 831 has space for axial movement, and the first cam structure 81 and the second cam structure 831 always match each other and contact each other well. Therefore, when the first cam structure 81 rotates, the second cam structure 831 is pushed by the first cam structure 81 to move axially along the first rotating shaft 41, to compress the first elastic member 84 or release compression of the first elastic member 84, increasing a damping effect and improving user experience of the user during folding.

During rotation of the first torsion swing arm 30 relative to the base 90, the first cam structure 81 disposed at the second end 32 of the first torsion swing arm 30 moves relative to the second cam structure 831 of the sliding member 83. Relative movement may be understood as that the second cam structure 831 is squeezed and slides relative to the first cam structure 81. This enables an axial distance between the second cam structure 831 and the first cam structure 81 to be changed. Further, the first elastic member 84 is compressed, and the first elastic member 84 squeezes the first cam structure 81 by using the second cam structure 831, generating a resistance to rotation of the first cam structure 81 and forming a damping force. When the damping force formed by the first elastic member 84 can prevent the first torsion swing arm 30 and the second torsion swing arm 60 from rotating freely under the action of gravity, the first torsion swing arm 30 may stop at any angle, so that the electronic device 200 is hovered at any angle.

Matching of the first concave part 812 and the second convex part 834 may be used for implementing stopping and positioning at an angle. For example, a start position and an end position of the first concave part 812 and a start position and an end position of the second convex part 834 are designed, and the second cam structure 831 slides along the first rotating shaft 41 at the start position and end position. This enables squeezing of the second cam structure 831 on the first cam structure 81 to be suddenly reduced, and a definite and timely feedback can be provided to the user. For example, when there are different angles between the first housing 220 and the second housing 230, such as 30°, 60°, 90°, or 120°, a definite and timely pause feeling may be provided to the user.

The second elastic member 85 is sleeved on the second rotating shaft 42 and abuts against the fourth cam structure 832 of the sliding member 83. For example, the second elastic member 85 may be an elastic body with an elastic recovery force such as a spring or a disc spring group. Therefore, due to a good elastic force of the second elastic member 85, the fourth cam structure 832 may be pushed to enable the fourth cam structure 832 to contact the third cam structure 82 by abutting, ensuring a damping effect achieved by the third cam structure 82 and the fourth cam structure 832.

It may be understood that the third cam structure 82 cannot move axially along the second rotating shaft 42, only the fourth cam structure 832 has space for axial movement, and the third cam structure 82 and the fourth cam structure 832 always match each other and contact each other well. Therefore, when the third cam structure 82 rotates, the fourth cam structure 832 is pushed by the third cam structure 82 to move axially along the second rotating shaft 42, to compress the second elastic member 85 or release compression of the second elastic member 85, increasing a damping effect and improving user experience of the user during folding.

During rotation of the second torsion swing arm 60 relative to the base 90, the third cam structure 82 disposed at the fourth end 62 of the second torsion swing arm 60 moves relative to the fourth cam structure 832 of the sliding member 83. Relative movement may be understood as that the fourth cam structure 832 is squeezed and slides relative to the third cam structure 82. This enables an axial distance between the fourth cam structure 832 and the third cam structure 82 to be changed. Further, the second elastic member 85 is compressed. The second elastic member 85 squeezes the third cam structure 82 by using the fourth cam structure 832, generating a resistance to rotation of the third cam structure 82 and forming a damping force. When the damping force formed by the second elastic member 85 can prevent the first torsion swing arm 30 and the second torsion swing arm 60 from rotating freely under the action of gravity, the second torsion swing arm 60 may stop at any angle, so that the electronic device 200 is hovered at any angle.

Matching of the third convex part 821 and the fourth convex part 836 may be used for implementing stopping and positioning at an angle. For example, a start position and an end position of the third convex part 821 and a start position and an end position of the fourth convex part 836 are designed, the fourth cam structure 832 slides along the second rotating shaft 42 at the start position and end position. This enables squeezing of the fourth cam structure 832 on the third cam structure 82 to be suddenly reduced, and a definite and timely feedback can be provided to the user. For example, when there are different angles between the first housing 220 and the second housing 230, such as 30°, 60°, 90°, or 120°, a definite and timely pause feeling may be provided to the user.

With reference to FIG. 6 and FIG. 7, the limiting member 86 includes a first limiting end 861, a second limiting end 862, and a second connecting part 863. The first limiting end 861 has a hollow structure and is sleeved and fixed to the first rotating shaft 41, so that the first elastic member 84 elastically abuts between the second cam structure 831 and the first limiting end 861. Therefore, the limiting member 86 is disposed to limit movement of the first elastic member 84 along the axial direction of the first rotating shaft 41, and effectively prevent the first elastic member 84 from being separated from the first rotating shaft 41 along a direction away from the sliding member 83, providing good fastening stability. Limiting the movement of the first elastic member 84 along the axial direction of the first rotating shaft 41 can limit movement of the sliding member 83 along the axial direction of the first rotating shaft 41 by abutting between the first elastic member 84 and the second cam structure 831 of the sliding member 83. This enables the sliding member 83 to have a proper sliding distance on the first rotating shaft 41.

The second limiting end 862 has a hollow structure and is sleeved and fixed to the second rotating shaft 42, so that the second elastic member 85 elastically abuts between the fourth cam structure 832 and the second limiting end 862. Therefore, the limiting member 86 can limit movement of the second elastic member 85 along the axial direction of the second rotating shaft 42, and effectively prevent the second elastic member 85 from being separated from the second rotating shaft 42 along a direction away from the sliding member 83, providing good fastening stability. Limiting the movement of the second elastic member 85 along the axial direction of the second rotating shaft 42 can limit movement of the sliding member 83 along the axial direction of the second rotating shaft 42 by abutting between the second elastic member 85 and the fourth cam structure 832 of the sliding member 83. This enables the sliding member 83 to have a proper sliding distance on the second rotating shaft 42.

The second connecting part 863 is connected between the first limiting end 861 and the second limiting end 862, and is located in a gap between the first rotating shaft 41 and the second rotating shaft 42.

Based on the foregoing description, it should be understood that, during movement of the sliding member 83 along the axial direction, the first elastic member 84 and the second elastic member 85 are in a compression state due to squeezing by the sliding member 83. Accordingly, an end, away from the sliding member 83, of the first elastic member 84 and an end, away from the sliding member 83, of the second elastic member 85 are subject to relatively great elastic forces. Therefore, disposing of the limiting member 86 at the ends can resolve, due to good position fastening stability of the limiting member 86 and the first rotating shaft 41 and the second rotating shaft 42, a problem that the first elastic member 84 and the second elastic member 85 fall off due to excessive forces is resolved. This helps to ensure that the foldable assembly 100 moves synchronously without deflection and has good reliability.

It may be understood that, in the foldable assembly 100, the first torsion swing arm 30, the first cam structure 81, the second cam structure 831, and the first elastic member 84 are coaxially disposed on the first rotating shaft 41. The first cam structure 81 disposed on the first torsion swing arm 30 is matched with the second cam structure 831 which can slide on the first rotating shaft 41. When the first torsion swing arm 30 rotates relative to the base, because the second cam structure 831 may be squeezed by the first cam structure 81 on the first torsion swing arm 30, the first elastic member 84 can be compressed to generate a damping force. A damping force of the foldable assembly 100 can be indirectly controlled by designing of surface profiles of the first cam structure 81 and the second cam structure 831.

The second torsion swing arm 60, the third cam structure 82, the fourth cam structure 832, and the second elastic member 85 are coaxially disposed on the second rotating shaft 42. The third cam structure 82 disposed on the second torsion swing arm 60 is matched with the fourth cam structure 832 which can slide on the second rotating shaft 42. When the first torsion swing arm rotates relative to the base, because the fourth cam structure 832 may be squeezed by the third cam structure 82 on the second torsion swing arm 60, the second elastic member 85 can be compressed to generate a damping force. A damping force of the foldable assembly 100 can be indirectly controlled by designing of surface profiles of the third cam structure 82 and the fourth cam structure 832.

Figure 8:
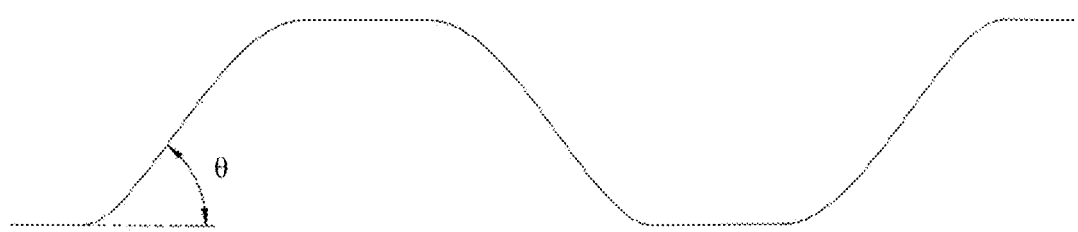
FIG. 8 is a schematic diagram of a part of a structure of a cam.

As the foldable assembly 100 is developing toward miniaturization, sizes of springs (such as the first elastic member 84 and the second elastic member 85) and sizes of cams (such as the first cam structure 81, the third cam structure 82, the second cam structure 831, and the fourth cam structure 832) are greatly reduced, resulting in a relatively small damping force provided by the foldable assembly. To ensure a proper damping force provided by the foldable assembly, a surface profile of the cam is to be changed, to increase a climbing amount and a climbing angle of the cam, and the damping force. However, a change of the surface profile of the cam shortens service life of the cam, leading to a failure of the foldable assembly 100. The climbing angle may be understood as an angle θ shown in FIG. 8.

Therefore, in this embodiment of this application, if the cam profile is not changed and the climbing angle of the cam is not changed, a range of an angle at which the foldable assembly 100 may be hovered may be further expanded by only matching with different speeds between a main swing arm (the first main swing arm 10 and the second main swing arm 50) and a torsion swing arm (the first torsion swing arm 30 and the second torsion swing arm 60), helping to implement hovering of the foldable assembly 100 at a large angle. For example, a range of an angle at which the foldable assembly may be hovered in conventional technologies is 80° to 120°, and the range of an angle at which the foldable assembly 100 may be hovered in the technical solution of this embodiment of this application may be 30° to 150°. Therefore, the range of an angle at which the foldable assembly 100 may be hovered is further expanded compared with the range of an angle at which the foldable assembly may be hovered in conventional technologies. Matching with different speeds between the main swing arm and the torsion swing arm may be understood as a difference between a rotational angle of the main swing arm and a rotational angle of the torsion swing arm. For example, originally, as the first main swing arm 10 is rotated by 1°, the first torsion swing arm 30 is rotated by 1°, and in case of matching with different speeds, as the first main swing arm 10 is rotated by 1°, the first torsion swing arm 30 is rotated by 2°. Matching with different speeds between the main swing arm and the torsion swing arm is implemented by designing of the first sliding groove 11 provided at the first main swing arm 10 and the second sliding groove 51 provided at the second main swing arm 50. Specific structures of the first sliding groove 11 and the second sliding groove 51 are described below.

Figure 9:
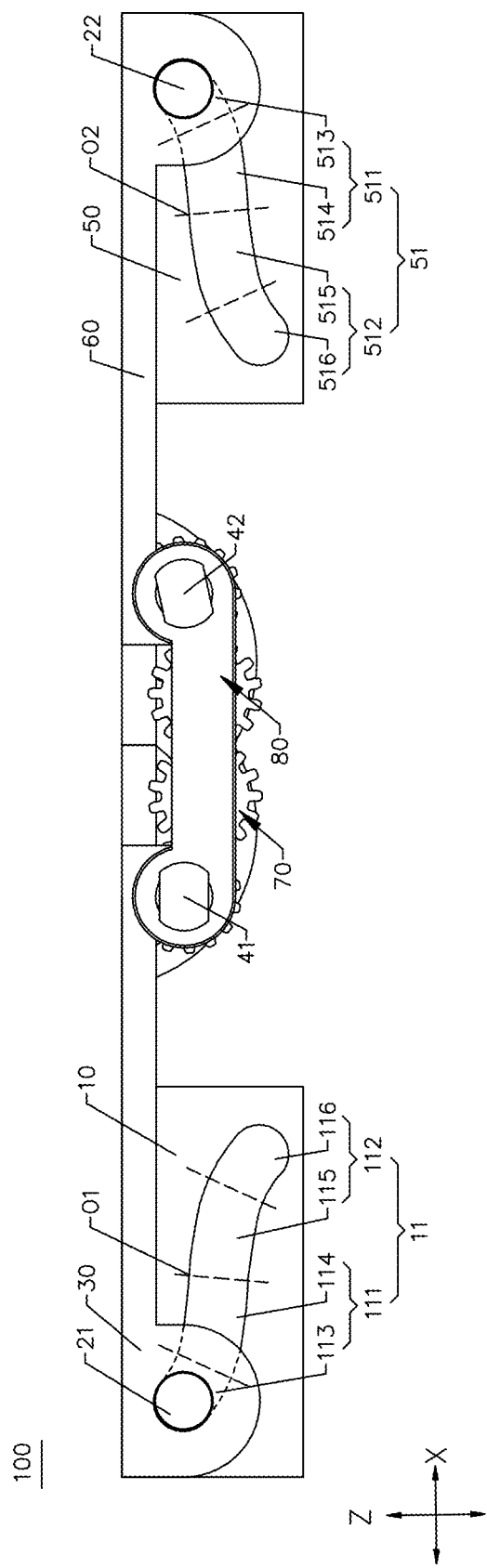
FIG. 9 is a schematic diagram of a structure of the foldable assembly shown in FIG. 7 in an unfolded state.
Figure 10:
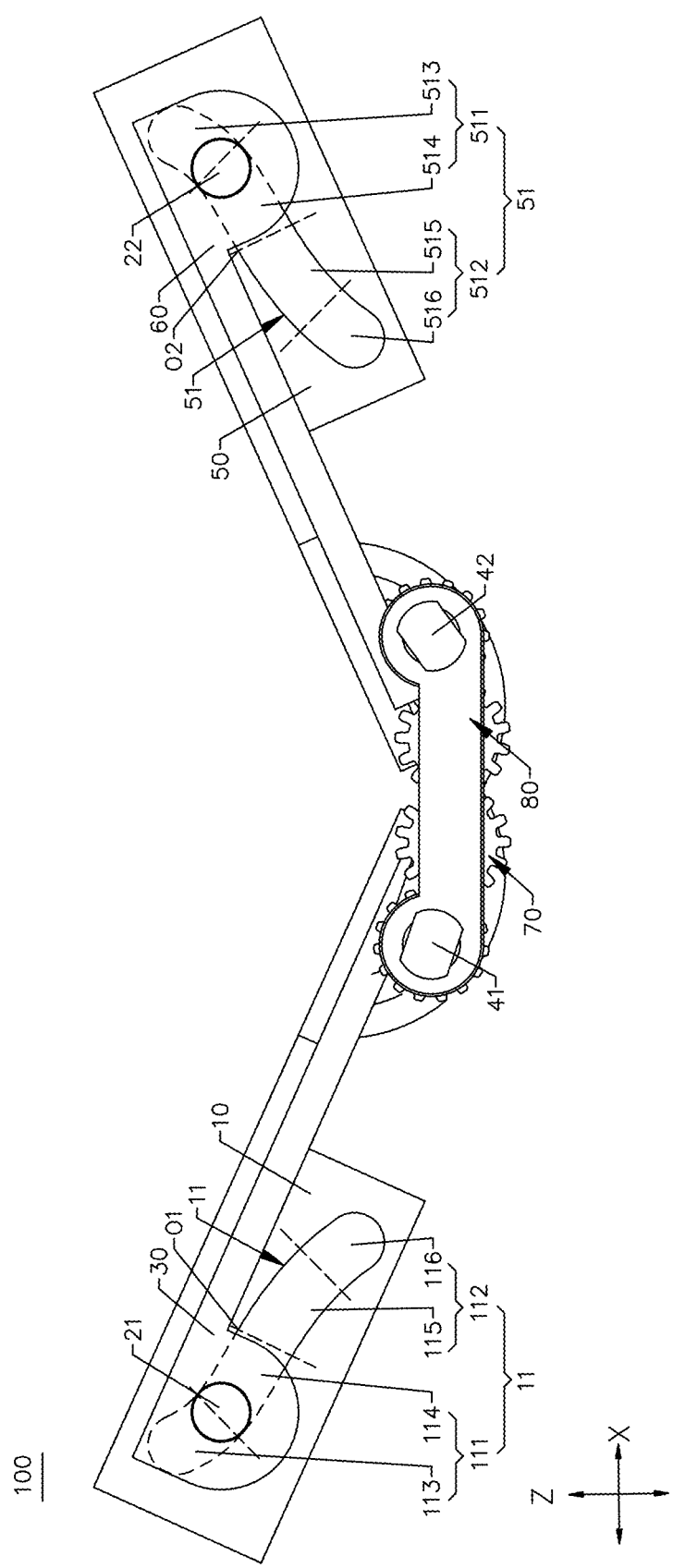
FIG. 10 is a schematic diagram of a structure of the foldable assembly shown in FIG. 7 in an intermediate state.
Figure 11:
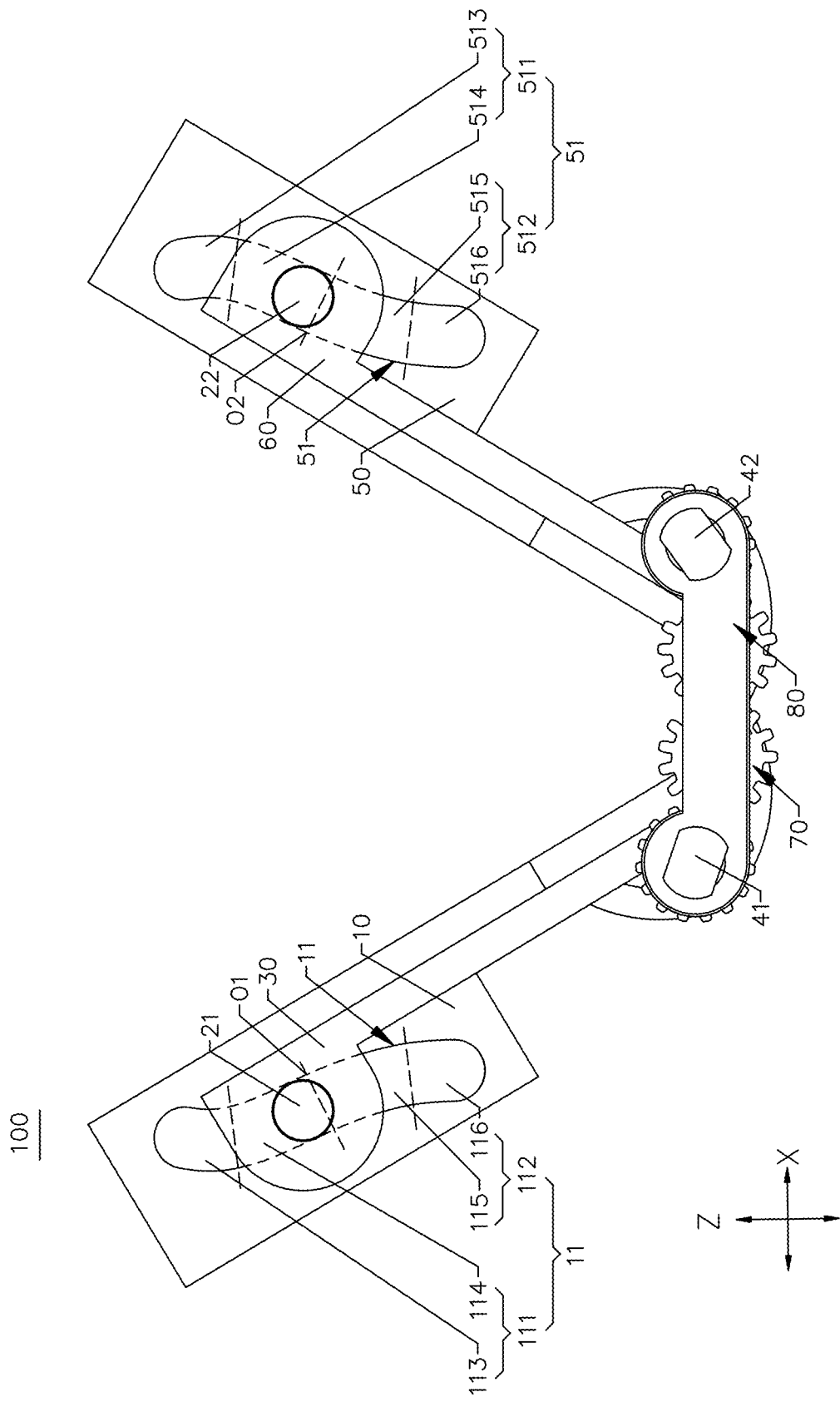
FIG. 11 is a schematic diagram of another structure of the foldable assembly shown in FIG. 7 in an intermediate state.

FIG. 9 is a schematic diagram of a structure of the foldable assembly 100 shown in FIG. 7 in an unfolded state. FIG. 10 is a schematic diagram of a structure of the foldable assembly 100 shown in FIG. 7 in an intermediate state. FIG. 11 is a schematic diagram of a structure of the foldable assembly 100 shown in FIG. 7 in another intermediate state. A length direction of the foldable assembly 100 is defined as a first direction. The first direction is marked as X. A height direction of the foldable assembly 100 is a second direction. The second direction is marked as Z. The first direction X is perpendicular to the second direction Z. It should be noted that the first direction X may be equivalent to a length direction of the electronic device 200, and the second direction Z may be equivalent to a height direction of the electronic device 200.

With reference to FIG. 9, FIG. 10, and FIG. 11, as the first main swing arm 10 and the second main swing arm 50 fold relative to each other, an included angle between the first main swing arm 10 and the second main swing arm 50 is decreased continually, the first shaft 21 continually slides in the first sliding groove 11 to drive the first torsion swing arm 30 to rotate with the first main swing arm 10, and the second shaft 22 continually slides in the second sliding groove 51 to drive the second torsion swing arm 60 to rotate with the second main swing arm 50. This enables the first torsion swing arm 30 and the second torsion swing arm 60 to fold relative to each other.

As shown in FIG. 9, the first sliding groove 11 includes a first segment 111 and a second segment 112. The first segment 111 includes a first acceleration segment 113 and a first gentle speed segment 114. The first acceleration segment 113 and the first gentle speed segment 114 are in a bending connection. The bending connection may be understood as that there is an included angle between the first acceleration segment 113 and the first gentle speed segment 114. The included angle may be within a range of 0° to 180°. An absolute value of a slope of the first acceleration segment 113 is greater than an absolute value of a slope of the first gentle speed segment 114. That an absolute value of a slope of the first acceleration segment 113 is greater than an absolute value of a slope of the first gentle speed segment 114 may be understood that an absolute value of a slope at any position on the first acceleration segment 113 is greater than an absolute value of a slope at any position on the first gentle speed segment 114.

A coordinate system is established with a first direction X as an abscissa x axis and a second direction Z as an ordinate. A flexible display 210 may be parallel to the x axis when the foldable assembly 100 is in the unfolded state. The slope of the first acceleration segment 113 indicates a degree of inclination of the first acceleration segment 113 relative to the x axis (the first direction X) when the foldable assembly 100 is in the unfolded state. A slope of a curve or straight line corresponding to the first acceleration segment 113 is positive or negative, and the absolute value of the slope of the first acceleration segment 113 is a positive value. The slope of the first gentle speed segment 114 indicates a degree of inclination of the first gentle speed segment 114 relative to the x axis (the first direction X) when the foldable assembly 100 is in the unfolded state. A slope of a curve or straight line corresponding to the first gentle speed segment 114 is positive or negative, and the absolute value of the slope of the first gentle speed segment 114 is a positive value. For example, the first acceleration segment 113 and the first gentle speed segment 114 may be located in a second quadrant of the coordinate system. The slope of the first acceleration segment 113 is a negative value, and the slope of the first gentle speed segment 114 is a negative value. The absolute value of the slope of the first acceleration segment 113 is greater than the absolute value of the slope of the first gentle speed segment 114.

It may be understood that the first shaft 21 can slide in the first acceleration segment 113 and the first gentle speed segment 114. A sliding speed of the first shaft 21 in the first acceleration segment 113 and a sliding speed of the first shaft 21 in the first gentle speed segment 114 are related to the absolute value of the slope of the first acceleration segment 113 and the absolute value of the slope of the first gentle speed segment 114 respectively. Specifically, when the first shaft 21 moves in a segment with a relatively large absolute value of a slope, a movement speed of the first shaft 21 in the segment is relatively fast. In this stage, an included angle between the first main swing arm 10 and the second main swing arm 50 may be changed relatively fast. When the first shaft 21 moves in a segment with a relatively small absolute value of a slope, a movement speed of the first shaft 21 in the segment is relatively slow. Therefore, in this stage, an included angle between the first main swing arm 10 and the second main swing arm 50 may be changed relatively slow. Therefore, when the first shaft 21 moves in the first acceleration segment 113, a movement speed of the first shaft 21 in the segment is relatively fast. When the first shaft 21 moves in the first gentle speed segment 114, a movement speed of the first shaft 21 in the segment is relatively slow.

The second segment 112 includes a second acceleration segment 116 and a second gentle speed segment 115. The second gentle speed segment 115 is connected to the first gentle speed segment 114. An end, away from the first gentle speed segment 114, of the second gentle speed segment 115 and the second acceleration segment 116 are in a bending connection. The bending connection may be understood as that there is an included angle between the second acceleration segment 116 and the second gentle speed segment 115, and the included angle may be within a range of 0° to 180°. An absolute value of a slope of the second acceleration segment 116 is greater than an absolute value of a slope of the second gentle speed segment 115. That the absolute value of a slope of the second acceleration segment 116 is greater than an absolute value of a slope of the second gentle speed segment 115 may be understood that an absolute value of a slope at any position of the second acceleration segment 116 is greater than an absolute value of a slope at any position of the second gentle speed segment 115.

A coordinate system is established with a first direction X as an abscissa x axis and a second direction Z as an ordinate. A flexible display 210 may be parallel to the x axis when the foldable assembly 100 is in the unfolded state. The slope of the second acceleration segment 116 indicates a degree of inclination of the second acceleration segment 116 relative to the x axis (the first direction X) when the foldable assembly 100 is in the unfolded state. A slope of a curve or straight line corresponding to the second acceleration segment 116 is positive or negative, and the absolute value of the slope of the second acceleration segment 116 is a positive value. The slope of the second gentle speed segment 115 indicates a degree of inclination of the second gentle speed segment 115 relative to the x axis (the first direction X) when the foldable assembly 100 is in the unfolded state. A slope of a curve or straight line corresponding to the second gentle speed segment 115 is positive or negative, and the absolute value of the slope of the second gentle speed segment 115 is a positive value. For example, the second acceleration segment 116 and the second gentle speed segment 115 may be located in a fourth quadrant of the coordinate system. The slope of the second acceleration segment 116 is a negative value, and the slope of the second gentle speed segment 115 is a negative value. The absolute value of the slope of the second acceleration segment 116 is greater than the absolute value of the slope of the second gentle speed segment 115.

It may be understood that the first shaft 21 can slide in the second gentle speed segment 115 and the second acceleration segment 116. A sliding speed of the first shaft 21 in the second acceleration segment 116 and a sliding speed of the first shaft 21 in the second gentle speed segment 115 are related to the absolute value of the slope of the second acceleration segment 116 and the absolute value of the slope of the second gentle speed segment 115. Specifically, when the first shaft 21 moves in a segment with a relatively large absolute value of a slope, a movement speed of the first shaft 21 in the segment is relatively fast. Therefore, in this stage, an included angle between the first main swing arm 10 and the second main swing arm 50 may be changed relatively fast. When the first shaft 21 moves in a segment with a relatively small absolute value of a slope, a movement speed of the first shaft 21 in the segment is relatively slow. Therefore, in this stage, an included angle between the first main swing arm 10 and the second main swing arm 50 may be changed relatively slow. Therefore, when the first shaft 21 moves in the second acceleration segment 116, a movement speed of the first shaft 21 in the segment is relatively fast. When the first shaft 21 moves in the second gentle speed segment 115, a movement speed of the first shaft 21 in the segment is relatively slow.

In this embodiment of this application, the second gentle speed segment 115 and the first gentle speed segment 114 are rotationally symmetrical. That is, the first gentle speed segment 114 can be rotated around a fixed point to be changed into the second gentle speed segment 115, and the second gentle speed segment 115 can be rotated around the same fixed point to be changed into the first gentle speed segment 114.

It should be noted that, in this embodiment of this application, an angle at which the first gentle speed segment 114 is rotated to be changed into the second gentle speed segment 115 or an angle at which the second gentle speed segment 115 is rotated to be changed into the first gentle speed segment 114 is not strictly limited, and the angle may be any angle, for example, 170° or 180°, on the basis of meeting working requirements of the foldable assembly 100. For example, as shown in FIG. 9, the first gentle speed segment 114 may be rotated around a midpoint of a line O1 to be changed into the second gentle speed segment 115.

Therefore, due to rotationally symmetrical disposing of the first gentle speed segment 114 and the second gentle speed segment 115, an absolute value of a slope at a joint of the first gentle speed segment 114 and the second gentle speed segment 115 changes slightly. A slight change of the absolute value of the slope can enable a speed at which the first shaft 21 moves from an end of the first gentle speed segment 114 to a start of the second gentle speed segment 115 to change slightly, and further enable a speed at which the first shaft 21 moves from the first gentle speed segment 114 to the second gentle speed segment 115 to change slightly.

Figure 12:
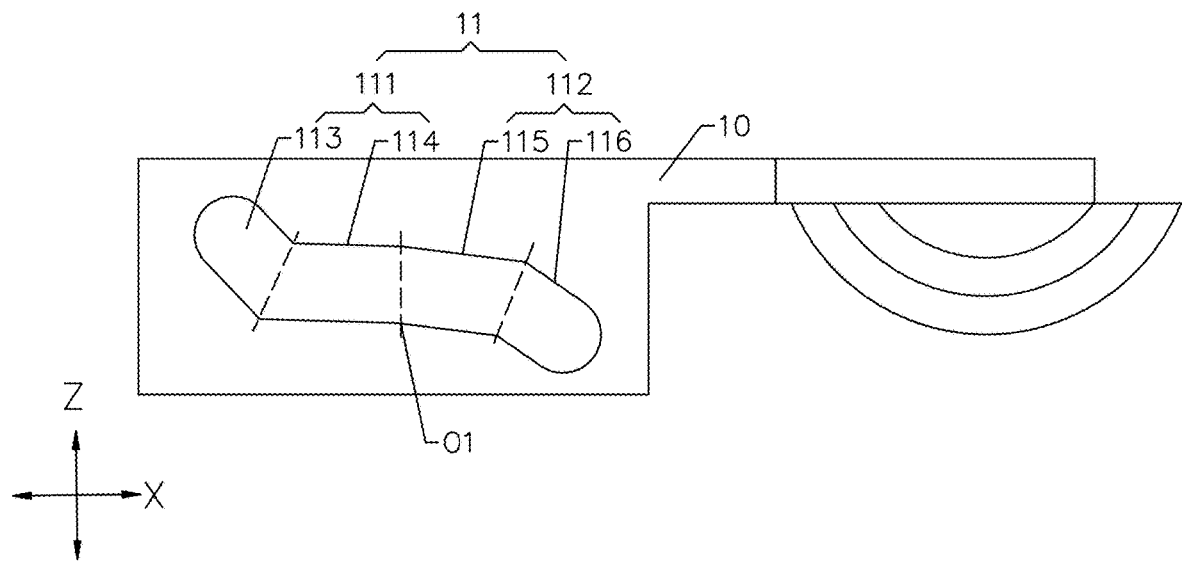
FIG. 12 is a schematic diagram of a structure of a first sliding groove of the foldable assembly shown in FIG. 7.
Figure 13:
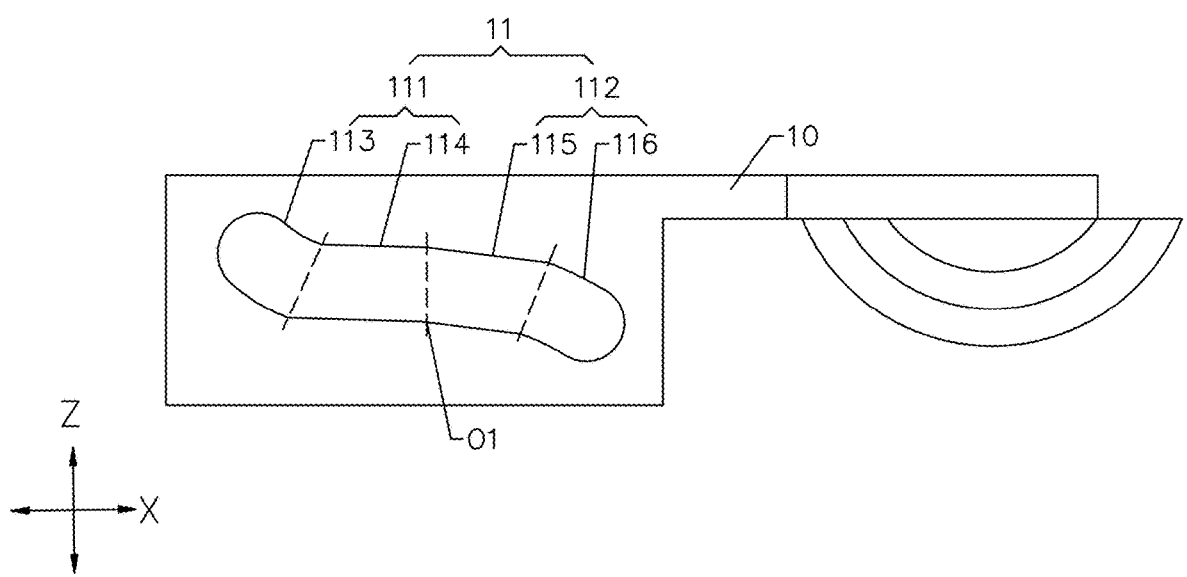
FIG. 13 is a schematic diagram of another structure of the first sliding groove of the foldable assembly shown in FIG. 7.

FIG. 12 is a schematic diagram of a structure of the first sliding groove 11 of the foldable assembly 100 shown in FIG. 7. FIG. 13 is a schematic diagram of another structure of the first sliding groove 11 of the foldable assembly 100 shown in FIG. 7. In FIG. 12 and FIG. 13, degrees of inclination of a first acceleration segment 113 relative to a first direction X are different.

In a possible implementation, as shown in FIG. 12 and FIG. 13, a second gentle speed segment 115 and a first gentle speed segment 114 are both straight line segments. Based on such disposing, the first gentle speed segment 114 and the second gentle speed segment 115 can jointly form a straight line segment shape or a broken line segment shape based on a difference between a rotational angle of the first gentle speed segment 114 and a rotational angle of the second gentle speed segment 115. Such disposing is flexible.

Figure 14:
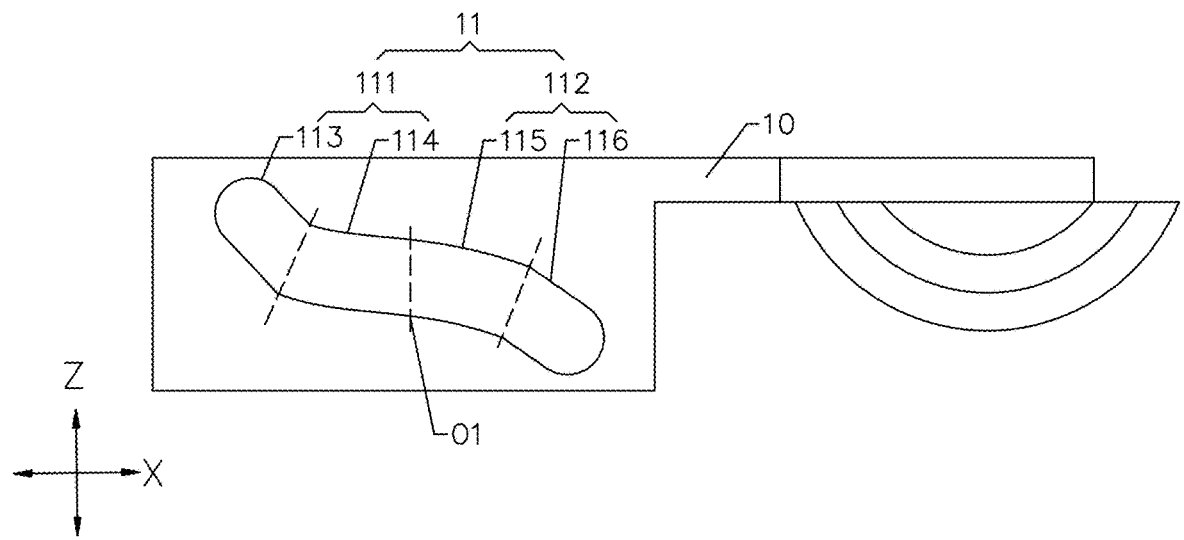
FIG. 14 is a schematic diagram of still another structure of the first sliding groove of the foldable assembly shown in FIG. 7.
Figure 15:
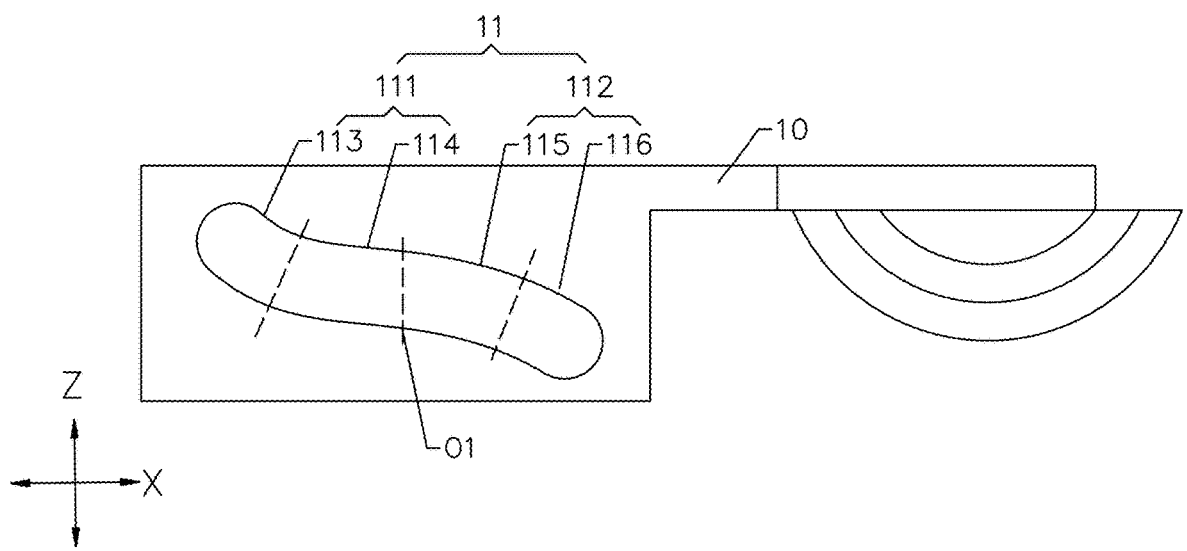
FIG. 15 is a schematic diagram of yet another structure of the first sliding groove of the foldable assembly shown in FIG. 7.

FIG. 14 is a schematic diagram of still another structure of the first sliding groove 11 of the foldable assembly 100 shown in FIG. 7. FIG. 15 is a schematic diagram of yet another structure of the first sliding groove 11 of the foldable assembly 100 shown in FIG. 7. In FIG. 14 and FIG. 15, degrees of inclination of a first acceleration segment 113 relative to a first direction X are different.

In another possible implementation, as shown in FIG. 14 and FIG. 15, both the second gentle speed segment 115 and the first gentle speed segment 114 are arc segments, and a center of curvature of the first gentle speed segment 114 and a center of curvature of the second gentle speed segment 115 are located on two sides of the first sliding groove 11 respectively. That the center of curvature of the first gentle speed segment 114 and a center of curvature of the second gentle speed segment 115 are located on two sides of the first sliding groove 11 respectively may be understood as that the center of curvature of the first gentle speed segment 114 and the center of curvature of the second gentle speed segment 115 are respectively located on one side of the first sliding groove 11 and an opposite side of the first sliding groove 11 with the first sliding groove 11 as a reference object. Based on such disposing, the first gentle speed segment 114 and the second gentle speed segment 115 can jointly form a curve segment of a different shape (for example, a wave shape or an S shape) based on a difference between a rotational angle of the first gentle speed segment 114 and a rotational angle of the second gentle speed segment 115. Such disposing is flexible.

Figure 16:
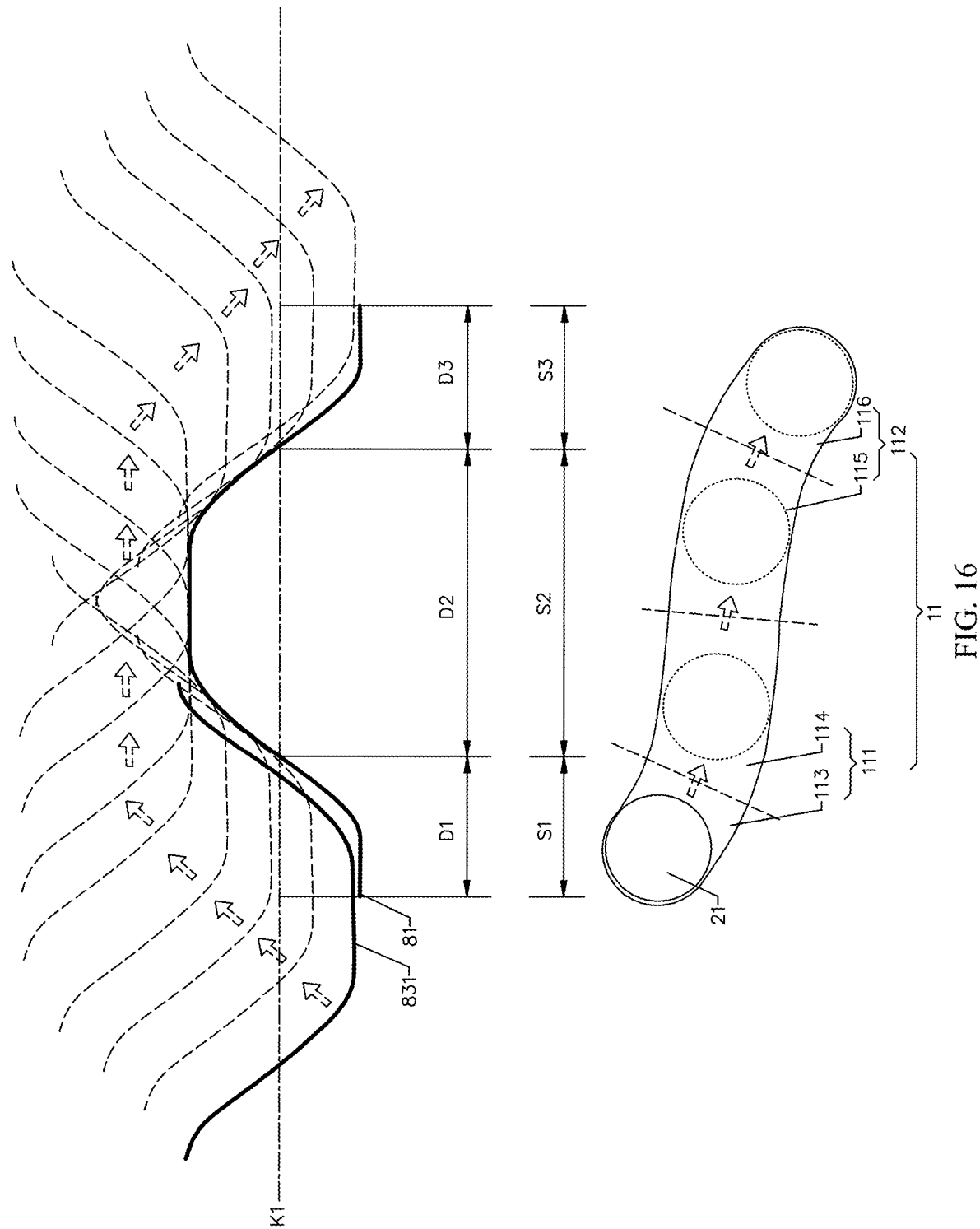
FIG. 16 is a diagram of a correspondence between a climbing path of a second cam structure and a moving path of a first shaft shown in FIG. 7.

FIG. 16 is a diagram of a correspondence between a climbing path of the second cam structure 831 and a moving path of the first shaft 21 shown in FIG. 7.

As shown in FIG. 16, a stage in which the first shaft 21 slides in a first acceleration segment 113 is a sliding stage S1. A stage in which the first shaft 21 slides in a first gentle speed segment 114 and a second gentle speed segment 115 is a sliding stage S2. A stage in which the first shaft 21 slides in a second acceleration segment 116 is a sliding stage S3.

Based on a change of absolute values of slopes of the first sliding groove 11 in segments, it may be known that when the first shaft 21 slides in the sliding stage S1, the sliding stage S2, and the sliding stage S3 in sequence, a movement speed of the first shaft 21 in the first sliding groove 11 presents three stages of "acceleration, a low speed, and acceleration".

In FIG. 16, it is stipulated that, when a damping force generated on rotation of a first cam structure 81 by a first elastic member 84 that squeezes the first cam structure 81 by using the second cam structure 831 is equal to gravity required for the first torsion swing arm 30 and the second torsion swing arm to rotate freely, a value of the damping force is a first peak value K1. A value less than the first peak value K1 indicates that the damping force provided by the first elastic member 84 is less than the gravity required for the first torsion swing arm 30 and the second torsion swing arm to rotate freely. A value greater than the first peak value K1 indicates that the damping force provided by the first elastic member 84 is greater than the gravity required for the first torsion swing arm 30 and the second torsion swing arm to rotate freely.

A stage in which the second cam structure 831 climbs along the first cam structure 81 from a left start position to the first peak value K1 is a climbing stage D1. A stage in which the second cam structure 831 continues to climb above the first peak value K1 along the first cam structure 81 is a climbing stage D2. A stage in which the second cam structure 831 then climbs to a right end position below the first peak value K1 along the first cam structure 81 is a climbing stage D3.

When the second cam structure 831 moves in the climbing stage D1, climbing stage D2, and climbing stage D3 in sequence, damping forces provided by the first elastic member 84 are respectively less than, greater than, and less than the gravity required for the first torsion swing arm 30 and the second torsion swing arm to rotate freely. In this case, a damping assembly 80 is in a first resistance state, a second resistance state, and a third resistance state respectively. When the second cam structure 831 moves in the climbing stage D2, because a damping force brought by the first elastic member 84 is greater than the gravity required for the first torsion swing arm 30 and the second torsion swing arm to rotate freely, a foldable assembly 100 can stop at any angle to implement hovering, further enabling an electronic device 200 to hover at any angle.

As shown in FIG. 16, when the first shaft 21 moves in the sliding stage S1, the second cam structure 831 moves in the climbing stage D1. When the first shaft 21 moves in the sliding stage S2, the second cam structure 831 moves in the climbing stage D2. When the first shaft 21 moves in the sliding stage S3, the first sliding end moves in the climbing stage D3. That is, the sliding stage S1 is corresponding to the climbing stage D1, the sliding stage S2 is corresponding to the climbing stage D2, and the sliding stage S3 is corresponding to the climbing stage D3.

When the first shaft 21 performs accelerated movement in the sliding stage S1, the damping force provided by the first elastic member 84 rapidly increases and approaches the first peak value K1. When the first shaft 21 enters the sliding stage S2 from an end of the sliding stage S1, the damping force provided by the first elastic member 84 is greater than the first peak value K1, and the foldable assembly 100 enters a hovering stage. A speed of the first shaft 21 in the sliding stage S2 is slower than a speed of the first shaft 21 in the sliding stage S1, so that the damping force provided by the first elastic member 84 is continuously reduced. In addition, because a speed of the first shaft 21 in the sliding stage S2 changes slightly, a speed of reduction of the damping force provided by the first elastic member 84 is decreased, and the stage in which the foldable assembly 100 may be hovered is prolonged. When the first shaft 21 enters the sliding stage S3 from an end of the sliding stage S2, the damping force provided by the first elastic member 84 is less than the first peak value K1, and the foldable assembly 100 is unfolded or folded.

Based on the foregoing description, it should be understood that a stage in which the first shaft 21 moves in the first acceleration segment 113 is an acceleration stage in which a damping force provided by the first elastic member 84 rapidly approaches the first peak value K1, a stage in which the first shaft 21 moves in the first gentle speed segment 114 and the second gentle speed segment 115 is a slow speed stage in which the damping force provided by the first elastic member 84 is greater than the first peak value K1, so that the foldable assembly 100 enters a hovering state, and a stage in which the first shaft 21 moves in the second acceleration segment 116 is an acceleration stage in which the damping force provided by the first elastic member 84 is less than the first peak value K1, so that the foldable assembly 100 is unfolded or folded. For example, when the foldable assembly 100 is in an unfolded state, the damping assembly 80 is in the first resistance state, the first shaft 21 slides in the first acceleration segment 113, and the first torsion swing arm 30 and the second torsion swing arm 60 are unfolded relative to each other. When the foldable assembly 100 is switched from the unfolded state to an intermediate state, the damping assembly 80 is in the second resistance state, the first shaft 21 slides in the first gentle speed segment 114 and the second gentle speed segment 115, and the first torsion swing arm 30 and the second torsion swing arm 60 gradually approach each other. When the foldable assembly 100 is switched from the intermediate state to a folded state, the damping assembly 80 is in the third resistance state, the first shaft 21 slides in the second acceleration segment 116, and the first torsion swing arm 30 and the second torsion swing arm 60 are folded relative to each other.

By designing of a structure of the first sliding groove 11, a rotation and folding trajectory of the first torsion swing arm 30 can be effectively defined, a rotation effect of the foldable assembly 100 can be ensured. In addition, a hand feeling of unfolding and folding the foldable assembly 100 in place can be ensured while a climbing feature of a cam is kept. Therefore, a stage in which the damping force provided by the first elastic member 84 is greater than the first peak value K1 may be prolonged as much as possible during rotation of the first torsion swing arm 30. In other words, during folding of the foldable assembly 100, a range of a rotational angle of the foldable assembly 100 corresponding to the first gentle speed segment 114 and the second gentle speed segment 115 may be large, and a range of a rotational angle of the foldable assembly 100 corresponding to the first acceleration segment 113 and the second acceleration segment 116 may be small, effectively prolonging a stage in which the foldable assembly 100 is hovered with the greatest damping. In addition, because the stage in which the foldable assembly 100 is hovered with the greatest damping is prolonged, a range of an angle at which the foldable assembly 100 may be hovered may be further expanded, helping to implement hovering of the foldable assembly 100 at a large angle. For example, a range of an angle at which a foldable assembly is hovered in conventional technologies is 80° to 120°, and a range of an angle at which the foldable assembly 100 is hovered in the technical solution of this application may be 30° to 150°.

In this embodiment of this application, the first acceleration segment 113 and the second acceleration segment 116 may be rotationally symmetrical. That is, the first acceleration segment 113 can be rotated around a fixed point to be changed into the second acceleration segment 116, and the second acceleration segment 116 can be rotated around the same fixed point to be changed into the first acceleration segment 113. For example, as shown in FIG. 9, the first acceleration segment 113 may be rotated around a midpoint of a line O1 to be changed into the second acceleration segment 116.

It should be noted that, in this embodiment of this application, an angle at which the first acceleration segment 113 is rotated to be changed into the second acceleration segment 116 or an angle at which the second acceleration segment 116 is rotated to be changed into the first acceleration segment 113 is not strictly limited, and the angle may be any angle, for example, 170° or 180°, on the basis of meeting working requirements of the foldable assembly 100.

Therefore, because the first acceleration segment 113 and the second acceleration segment 116 are rotationally symmetrical, and the first gentle speed segment 114 and the second gentle speed segment 115 are rotationally symmetrical, the first segment 111 and the second segment 112 may be rotationally symmetrical. That is, the first segment 111 can be rotated around a fixed point to be changed into the second segment 112, and the second segment 112 can be rotated around the same fixed point to be changed into the first segment 111. By dividing of the structure of the first sliding groove 11 into two segments, an absolute value of a slope at a joint of the first segment 111 and the second segment 112 may change slightly because the first segment 111 and the second segment 112 are rotationally symmetrical. A slight change of the absolute value of the slope can enable a speed at which the first shaft 21 moves from an end of the first segment 111 to a start of the second segment 112 to change slightly, helping to prolong the sliding stage S2, and further prolonging the stage in which the foldable assembly 100 may be hovered.

For example, the first shaft 21 passes the first acceleration segment 113, the first gentle speed segment 114, the second gentle speed segment 115, and the second acceleration segment 116 in sequence. It may be known that, based on a change of an absolute value of a slope of the first acceleration segment 113 and an absolute value of a slope of the first gentle speed segment 114 in the first segment 111, a speed of the first shaft 21 in the first segment 111 is fast first and then slow. It may be known that, based on a change of an absolute value of a slope of the second gentle speed segment 115 and an absolute value of a slope of the second acceleration segment 116 in the second segment 112, a speed of the first shaft 21 in the second segment 112 is slow first and then fast. This enables a movement speed of the first shaft 21 to be divided into three stages, namely, "acceleration, a slow speed, and acceleration". The movement speed of the first shaft 21 is related to the damping force provided by the first elastic member 84. When the first shaft 21 starts acceleration in a first stage, the damping force provided by the first elastic member 84 rapidly approaches the first peak value K1. When the first shaft 21 starts to move slowly in a second stage, the damping force provided by the first elastic member 84 is greater than the first peak value K1, and the foldable assembly 100 enters a hovering stage. When slow movement of the first shaft 21 in the second stage ends and the first shaft 21 starts acceleration in a third stage, the damping force provided by the first elastic member 84 is less than the first peak value K1, and the foldable assembly 100 is unfolded or folded.

It should be noted that, in this embodiment of this application, an angle at which the first segment 111 is rotated to be changed into the second segment 112 or an angle at which the second segment 112 is rotated to be changed into the first segment 111 is not strictly limited, and the angle may be any angle, for example, 170° or 180°, on the basis of meeting working requirements of the foldable assembly 100.

In a possible implementation, as shown in FIG. 12 and FIG. 14, the first acceleration segment 113 and the second acceleration segment 116 are both straight line segments. In this implementation, as shown in FIG. 12, the first gentle speed segment 114 and the second gentle speed segment 115 may be straight line segments, so that the first sliding groove 11 presents a broken line shape as a whole that includes only straight line segments. Alternatively, as shown in FIG. 14, the first gentle speed segment 114 and the second gentle speed segment 115 may be arc segments, so that the first sliding groove 11 presents a curve shape as a whole in which an arc segment and a straight line segment are mixed.

In another possible implementation, as shown in FIG. 13 and FIG. 15, both the first acceleration segment 113 and the second acceleration segment 116 are arc segments, and a center of curvature of the first acceleration segment 113 and a center of curvature of the second acceleration segment 116 are located on two sides of the first sliding groove 11 respectively. That the center of curvature of the first acceleration segment 113 and a center of curvature of the second acceleration segment 116 are located on two sides of the first sliding groove 11 respectively may be understood as that the center of curvature of the first acceleration segment 113 and the center of curvature of the second acceleration segment 116 are respectively located on one side of the first sliding groove 11 and an opposite side of the first sliding groove 11 with the first sliding groove 11 as a reference object. In addition, the center of curvature of the first acceleration segment 113 and the center of curvature of the first gentle speed segment 114 are located on a same side of the first sliding groove 11, and the center of curvature of the second acceleration segment 116 and the center of curvature of the second gentle speed segment 115 are located on a same side of the first sliding groove 11.

In this implementation, as shown in FIG. 13, the first gentle speed segment 114 and the second gentle speed segment 115 may be straight line segments, so that the first sliding groove 11 presents a curve shape as a whole in which an arc segment and a straight line segment are mixed. Alternatively, as shown in FIG. 15, the first gentle speed segment 114 and the second gentle speed segment 115 may be arc segments, so that the first sliding groove 11 presents a curve shape as a whole that includes only arc segments.

Figure 17:
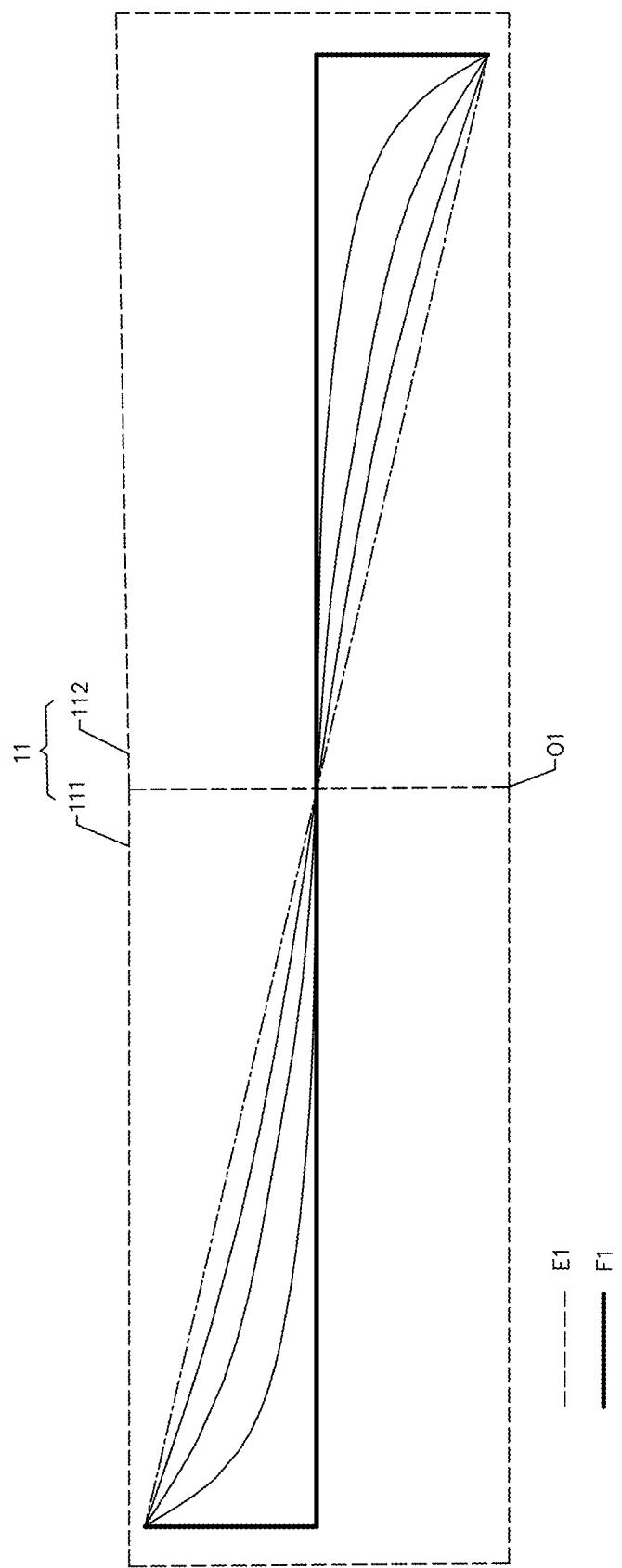
FIG. 17 is a schematic diagram of shape deformation of the first sliding groove shown in FIG. 7.

FIG. 17 is a schematic diagram of shape deformation of the first sliding groove 11 shown in FIG. 7. A line E1 is a reference line of a shape of the first sliding groove 11, and a line F1 is a limit line of the shape of the first sliding groove 11.

As shown in FIG. 17, the shape of the first sliding groove 11 may be designed within a range of the line E1 and the line F1 (including the line F1), which is not strictly limited.

Still refer to FIG. 9, the second sliding groove 51 includes a third segment 511 and a fourth segment 512. The third segment 511 includes a third acceleration segment 513 and a third gentle speed segment 514. The third acceleration segment 513 and the third gentle speed segment 514 are in a bending connection. The bending connection may be understood as that there is an included angle between the third acceleration segment 513 and the third gentle speed segment 514, and the included angle may be within an angle range of 0° to 180°. An absolute value of a slope of the third acceleration segment 513 is greater than an absolute value of a slope of the third gentle speed segment 514. That the absolute value of a slope of the third acceleration segment 513 is greater than an absolute value of a slope of the third gentle speed segment 514 may be understood that an absolute value of a slope at any position of the third acceleration segment 513 is greater than an absolute value of a slope at any position of the third gentle speed segment 514.

A coordinate system is established with a first direction X as an abscissa x axis and a second direction Z as an ordinate. A flexible display 210 may be parallel to the x axis when the foldable assembly 100 is in the unfolded state. The slope of the third acceleration segment 513 indicates a degree of inclination of the third acceleration segment 513 relative to the x axis (the first direction X) when the foldable assembly 100 is in the unfolded state. A slope of a curve or straight line corresponding to the third acceleration segment 513 is positive or negative, and the absolute value of the slope of the third acceleration segment 513 is a positive value. The slope of the third gentle speed segment 514 indicates a degree of inclination of the third gentle speed segment 514 relative to the x axis (the first direction X) when the foldable assembly 100 is in the unfolded state. A slope of a curve or straight line corresponding to the third gentle speed segment 514 is positive or negative, and the absolute value of the slope of the third gentle speed segment 514 is a positive value. For example, the third acceleration segment 513 and the third gentle speed segment 514 may be located in a first quadrant of the coordinate system. The slope of the third acceleration segment 513 is a positive value, and the slope of the third gentle speed segment 514 is a positive value. The absolute value of the slope of the third acceleration segment 513 is greater than the absolute value of the slope of the third gentle speed segment 514.

It may be understood that the second shaft 22 can slide in the third acceleration segment 513 and the third gentle speed segment 514. A sliding speed of the second shaft 22 in the third acceleration segment 513 and a sliding speed of the second shaft 22 in the third gentle speed segment 514 are related to the absolute value of the slope of the third acceleration segment 513 and the absolute value of the slope of the third gentle speed segment 514. Specifically, when the second shaft 22 moves in a segment with a relatively large absolute value of a slope, a movement speed of the second shaft 22 in the segment is relatively fast, and an included angle between the first main swing arm 10 and the second main swing arm 50 may be changed relatively fast. When the second shaft 22 moves in a segment with a relatively small absolute value of a slope, a movement speed of the second shaft 22 in the segment is relatively slow. Therefore, in this stage, an included angle between the first main swing arm 10 and the second main swing arm 50 may be changed relatively slow. Therefore, when the second shaft 22 moves in the third acceleration segment 513, a movement speed of the first shaft 21 in the segment is relatively fast. When the first shaft 21 moves in the third gentle speed segment 514, a movement speed of the first shaft 21 in the segment is relatively slow.

The fourth segment 512 includes a fourth acceleration segment 516 and a fourth gentle speed segment 515. The fourth gentle speed segment 515 is connected to the third gentle speed segment 514. An end, away from the third gentle speed segment 514, of the fourth gentle speed segment 515 and the fourth acceleration segment 516 are in a bending connection. The bending connection may be understood as that there is an included angle between the fourth acceleration segment 516 and the fourth gentle speed segment 515, and the included angle may be within a range of 0° to 180°. An absolute value of a slope of the fourth acceleration segment 516 is greater than an absolute value of a slope of the fourth gentle speed segment 515. That the absolute value of a slope of the fourth acceleration segment 516 is greater than an absolute value of a slope of the fourth gentle speed segment 515 may be understood that an absolute value of a slope at any position of the fourth acceleration segment 516 is greater than an absolute value of a slope at any position of the fourth gentle speed segment 515.

A coordinate system is established with a first direction X as an abscissa x axis and a second direction Z as an ordinate. A flexible display 210 may be parallel to the x axis when the foldable assembly 100 is in the unfolded state. The slope of the fourth acceleration segment 516 indicates a degree of inclination of the fourth acceleration segment 516 relative to the x axis (the first direction X) when the foldable assembly 100 is in the unfolded state. A slope of a curve or straight line corresponding to the fourth acceleration segment 516 is positive or negative, and the absolute value of the slope of the fourth acceleration segment 516 is a positive value. The slope of the fourth gentle speed segment 515 indicates a degree of inclination of the fourth gentle speed segment 515 relative to the x axis (the first direction X) when the foldable assembly 100 is in the unfolded state. A slope of a curve or straight line corresponding to the fourth gentle speed segment 515 is positive or negative, and the absolute value of the slope of the fourth gentle speed segment 515 is a positive value. For example, the fourth acceleration segment 516 and the fourth gentle speed segment 515 may be located in a third quadrant of the coordinate system. The slope of the fourth acceleration segment 516 is a positive value, and the slope of the fourth gentle speed segment 515 is a negative value. The absolute value of the slope of the fourth acceleration segment 516 is greater than the absolute value of the slope of the fourth gentle speed segment 515.

It may be understood that the second shaft 22 can slide in the fourth gentle speed segment 515 and the fourth acceleration segment 516, and a sliding speed of the second shaft 22 in the fourth acceleration segment 516 and a sliding speed of the second shaft 22 in the fourth gentle speed segment 515 are related to the absolute value of the slope of the fourth acceleration segment 516 and the absolute value of the slope of the fourth gentle speed segment 515. Specifically, when the second shaft 22 moves in a segment with a relatively large absolute value of a slope, a movement speed of the second shaft 22 in the segment is relatively fast. Therefore, in this stage, an included angle between the first main swing arm 10 and the second main swing arm 50 may be changed relatively fast. When the second shaft 22 moves in a segment with a relatively small absolute value of a slope, a movement speed of the second shaft 22 in the segment is relatively slow. Therefore, in this stage, an included angle between the first main swing arm 10 and the second main swing arm 50 may be changed relatively slow. Therefore, when the second shaft 22 moves in the fourth acceleration segment 516, a movement speed of the second shaft 22 in the segment is relatively fast. When the second shaft 22 moves in the fourth gentle speed segment 515, a movement speed of the second shaft 22 in the segment is relatively slow.

In this embodiment of this application, the fourth gentle speed segment 515 and the third gentle speed segment 514 are rotationally symmetrical. That is, the third gentle speed segment 514 can be rotated around a fixed point to be changed into the fourth gentle speed segment 515, and the fourth gentle speed segment 515 can be rotated around the same fixed point to be changed into the third gentle speed segment 514.

It should be noted that, in this embodiment of this application, an angle at which the third gentle speed segment 514 is rotated to be changed into the fourth gentle speed segment 515 or an angle at which the fourth gentle speed segment 515 is rotated to be changed into the third gentle speed segment 514 is not strictly limited, and the angle may be any angle, for example, 170° or 180°, on the basis of meeting working requirements of the foldable assembly 100. For example, as shown in FIG. 9, the third gentle speed segment 514 may be rotated around a midpoint of a line O2 to be changed into the fourth gentle speed segment 515.

Therefore, due to rotationally symmetrical disposing of the third gentle speed segment 514 and the fourth gentle speed segment 515, an absolute value of a slope at a joint of the third gentle speed segment 514 and the fourth gentle speed segment 515 changes slightly. A slight change of the absolute value of the slope can enable a speed at which the second shaft 22 moves from an end of the third gentle speed segment 514 to a start of the fourth gentle speed segment 515 to change slightly, and further enable a speed at which the first shaft 21 moves from the third gentle speed segment to the fourth gentle speed segment 515 to change slightly.

Figure 18:
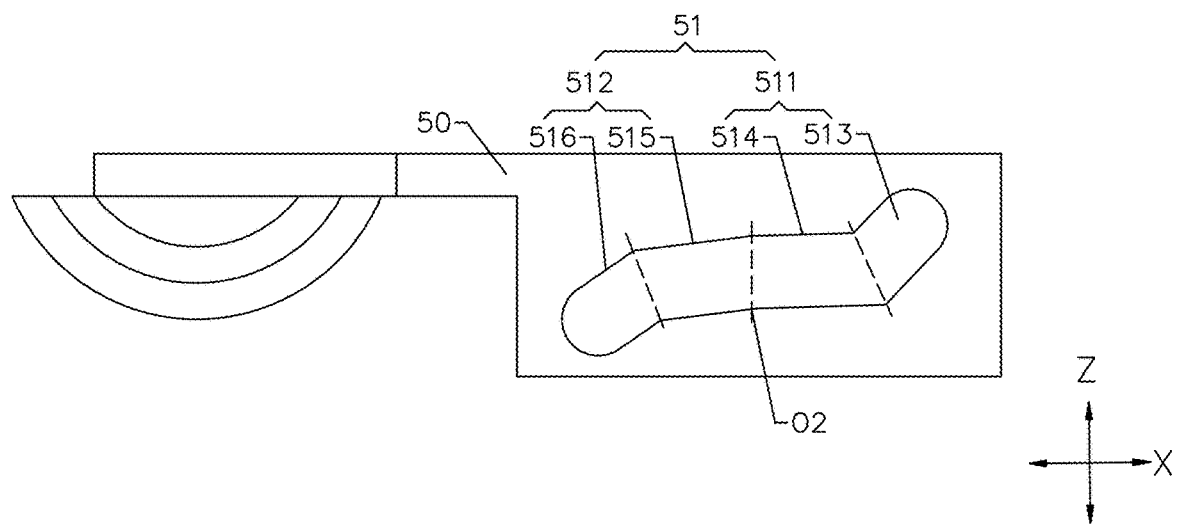
FIG. 18 is a schematic diagram of a structure of a second sliding groove of the foldable assembly shown in FIG. 7.
Figure 19:
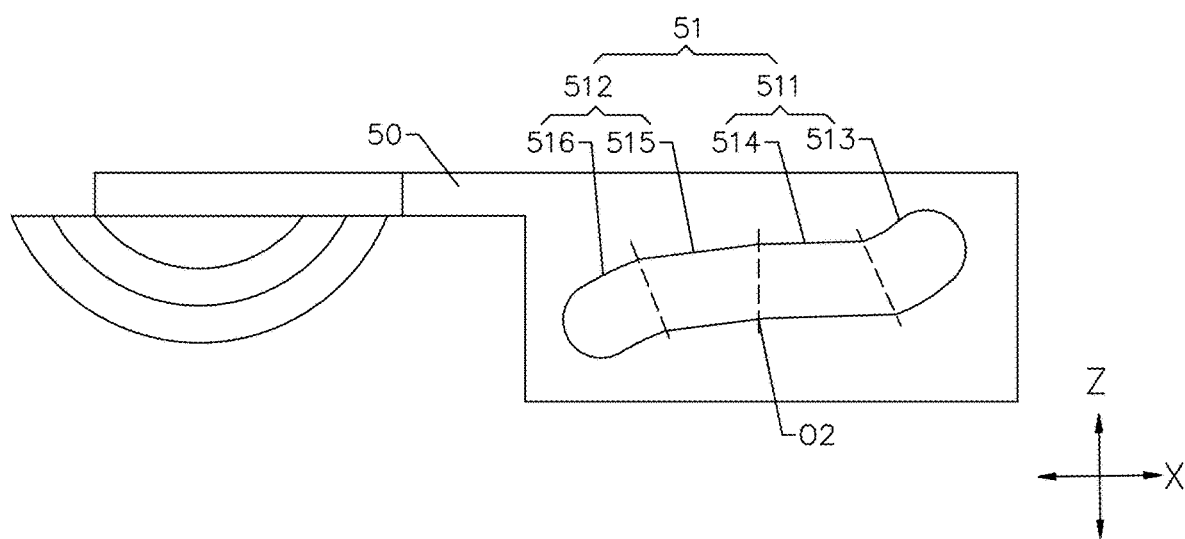
FIG. 19 is a schematic diagram of another structure of the second sliding groove of the foldable assembly shown in FIG. 7.

FIG. 18 is a schematic diagram of a structure of the second sliding groove 51 of the foldable assembly 100 shown in FIG. 7. FIG. 19 is a schematic diagram of another structure of the second sliding groove 51 of the foldable assembly 100 shown in FIG. 7. In FIG. 18 and FIG. 19, degrees of inclination of a third acceleration segment 513 relative to a first direction X are different.

In a possible implementation, as shown in FIG. 18 and FIG. 19, a fourth gentle speed segment 515 and a third gentle speed segment 514 are both straight line segments. Based on such disposing, the third gentle speed segment 514 and the fourth gentle speed segment 515 can jointly form a straight line segment shape or a broken line segment shape based on a difference between a rotational angle of the third gentle speed segment 514 and a rotational angle of the fourth gentle speed segment 515. Such disposing is flexible.

Figure 20:
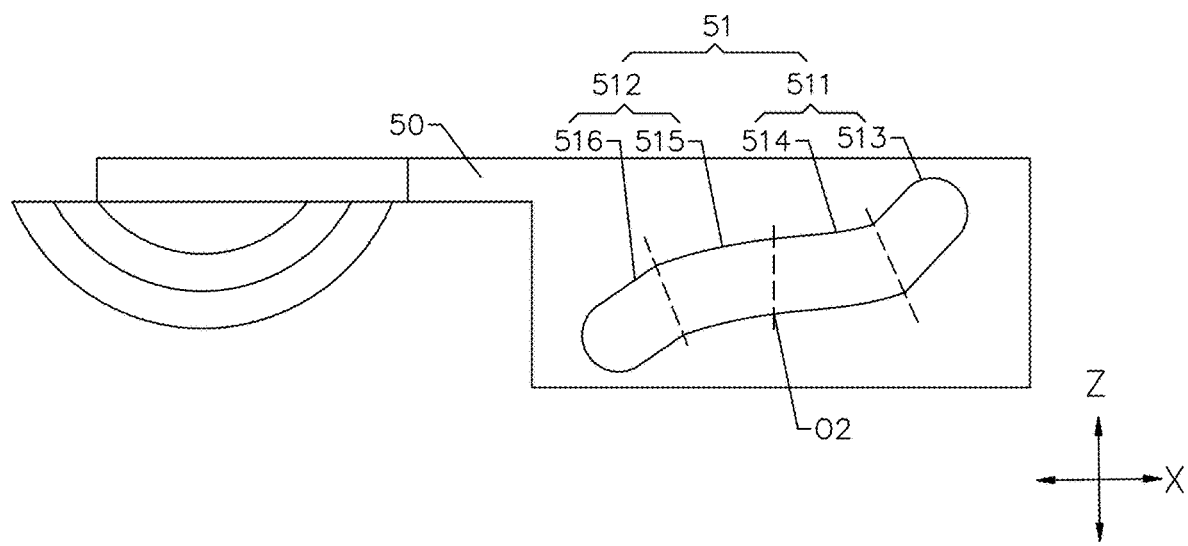
FIG. 20 is a schematic diagram of still another structure of the second sliding groove of the foldable assembly shown in FIG. 7.
Figure 21:
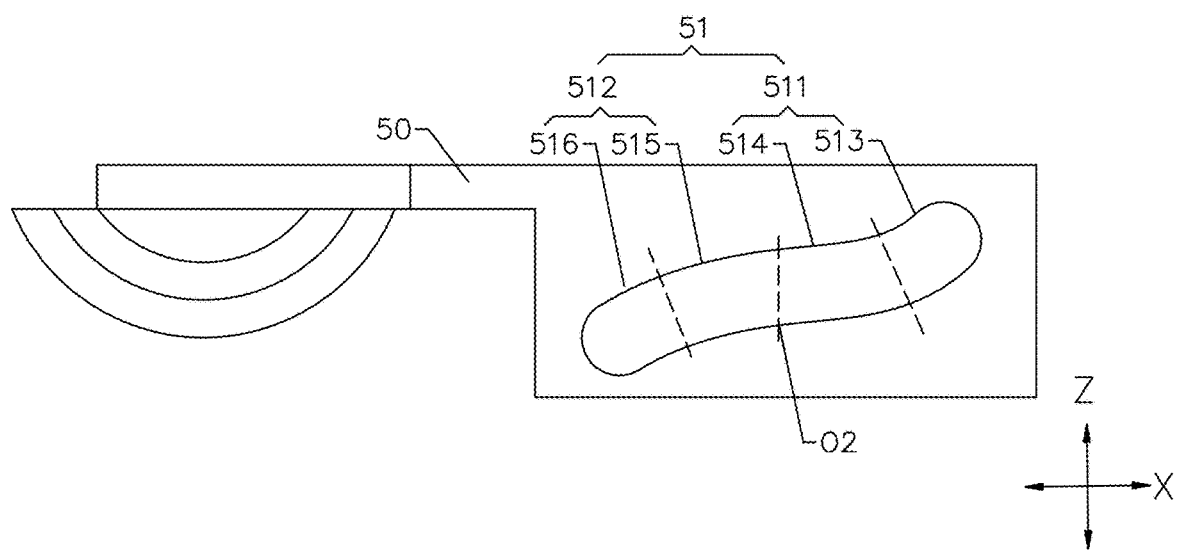
FIG. 21 is a schematic diagram of yet another structure of the second sliding groove of the foldable assembly shown in FIG. 7.

FIG. 20 is a schematic diagram of still another structure of the second sliding groove 51 of the foldable assembly 100 shown in FIG. 7. FIG. 21 is a schematic diagram of yet another structure of the second sliding groove 51 of the foldable assembly 100 shown in FIG. 7. In FIG. 20 and FIG. 21, degrees of inclination of a third acceleration segment 513 relative to a first direction X are different.

In another possible implementation, as shown in FIG. 20 and FIG. 21, both the fourth gentle speed segment 515 and the third gentle speed segment 514 are arc segments, and a center of curvature of the third gentle speed segment 514 and a center of curvature of the fourth gentle speed segment 515 are located on two sides of the second sliding groove 51 respectively. That the center of curvature of the third gentle speed segment 514 and a center of curvature of the fourth gentle speed segment 515 are located on two sides of the second sliding groove 51 respectively may be understood as that the center of curvature of the third gentle speed segment 514 and the center of curvature of the fourth gentle speed segment 515 are located on one side of the second sliding groove 51 and an opposite side of the second sliding groove 51 respectively with the second sliding groove 51 as a reference object. Based on such disposing, the third gentle speed segment 514 and the fourth gentle speed segment 515 can jointly form a curve segment of a different shape (for example, a wave shape or an S shape) based on a difference between a rotational angle of the third gentle speed segment 514 and a rotational angle of the fourth gentle speed segment 515. Such disposing is flexible.

Figure 22:
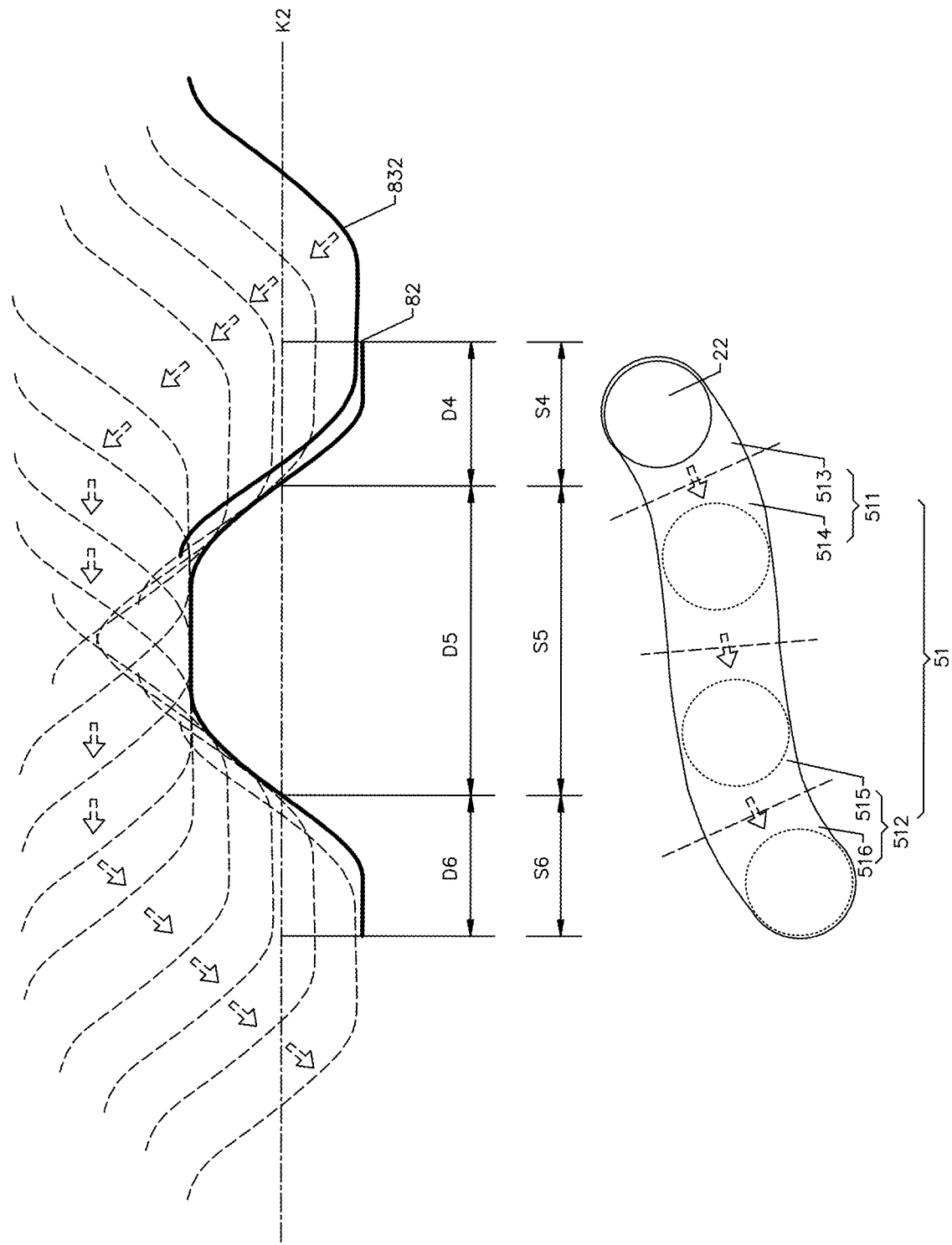
FIG. 22 is a diagram of a correspondence between a climbing path of a fourth cam structure and a moving path of a second shaft shown in FIG. 7.

FIG. 22 is a diagram of a correspondence between a climbing path of a fourth cam structure 832 and a moving path of a second shaft 22 shown in FIG. 7.

As shown in FIG. 22, a stage in which the second shaft 22 slides in a third acceleration segment 513 is a sliding stage S4. A stage in which the second shaft 22 slides in a third gentle speed segment 514 and a fourth gentle speed segment 515 is a sliding stage S5. A stage in which the second shaft 22 slides in a fourth acceleration segment 516 is a sliding stage S6.

Based on a change of absolute values of slopes of the first sliding groove 11 in segments, it may be known that, when the second shaft 22 slides in the sliding stage S4, the sliding stage S5, and the sliding stage S6 in sequence, a movement speed of the second shaft 22 in the first sliding groove 11 presents three stages of "acceleration, a low speed, and acceleration".

In FIG. 22, it is stipulated that, when a damping force generated on rotation of a third cam structure 82 by a second elastic member 85 that squeezes the third cam structure 82 by using the fourth cam structure 832 is equal to gravity required for the first torsion swing arm 30 and the second torsion swing arm to rotate freely, a critical limit is a second peak value K2. A value less than the second peak value K2 indicates that the damping force provided by the second elastic member 85 is less than the gravity required for the first torsion swing arm 30 and the second torsion swing arm to rotate freely. A value greater than the second peak value K2 indicates that the damping force provided by the second elastic member 85 is greater than the gravity required for the first torsion swing arm 30 and the second torsion swing arm to rotate freely.

A stage in which the fourth cam structure 832 climbs along the third cam structure 82 from a left start position to the second peak value K2 is a climbing stage D4. A stage in which the fourth cam structure 832 continues to climb above the second peak value K2 along the third cam structure 82 is a climbing stage D5. A stage in which the fourth cam structure 832 climbs to a right end position below the second peak value K2 along the third cam structure 82 is a climbing stage D6.

When the fourth cam structure 832 moves in the climbing stage D4, climbing stage D5, and climbing stage D6 in sequence, damping forces provided by the second elastic member 85 are respectively less than, greater than, and less than the gravity required for the first torsion swing arm 30 and the second torsion swing arm to rotate freely. In this case, a damping assembly 80 is in a first resistance state, a second resistance state, and a third resistance state respectively. When the fourth cam structure 832 moves in the climbing stage D5, because a damping force brought by the second elastic member 85 is greater than the gravity required for the first torsion swing arm 30 and the second torsion swing arm to rotate freely, a foldable assembly 100 can stop at any angle to implement hovering, further enabling an electronic device 200 to hover at different angles.

As shown in FIG. 22, when the second shaft 22 moves in the sliding stage S4, the fourth cam structure 832 moves in the climbing stage D4. When the second shaft 22 moves in the sliding stage S5, the fourth cam structure 832 moves in the climbing stage D5. When the second shaft 22 moves in the sliding stage S6, the first sliding end moves in the climbing stage D6. That is, the sliding stage S4 is corresponding to the climbing stage D4, the sliding stage S5 is corresponding to the climbing stage D5, and the sliding stage S6 is corresponding to the climbing stage D6.

When the second shaft 22 performs accelerated movement in the sliding stage S4, the damping force provided by the second elastic member 85 rapidly increases and approaches the second peak value K2. When the second shaft 22 enters the sliding stage S5 from an end of the sliding stage S4, the damping force provided by the second elastic member 85 is greater than the second peak value K2, and the foldable assembly 100 enters a hovering stage. A speed of the second shaft 22 in the sliding stage S5 is slower than a speed of the second shaft 22 in the sliding stage S4, so that the damping force provided by the second elastic member 85 is continuously reduced. In addition, because a speed of the second shaft 22 in the sliding stage S5 changes slightly, a speed of reduction of the damping force provided by the second elastic member 85 is decreased, and the stage in which the foldable assembly 100 may be hovered is prolonged. When the second shaft 22 enters the sliding stage S6 from an end of the sliding stage S5, the damping force provided by the second elastic member 85 is less than the second peak value K2, and the foldable assembly 100 is unfolded or folded.

Based on the foregoing description, it should be understood that a stage in which the second shaft 22 moves in the third acceleration segment 513 is an acceleration stage in which a damping force provided by the second elastic member 85 rapidly approaches the second peak value K2, a stage in which the second shaft 22 moves in the third gentle speed segment 514 and the fourth gentle speed segment 515 is a slow speed stage in which the damping force provided by the second elastic member 85 is greater than the second peak value K2, so that the foldable assembly 100 is in a hovering state, and a stage in which the second shaft 22 moves in the fourth acceleration segment 516 is an acceleration stage in which the damping force provided by the second elastic member 85 is less than the second peak value K2, so that the foldable assembly 100 is rapidly unfolded or folded. For example, when the foldable assembly 100 is in an unfolded state, the damping assembly 80 is in the first resistance state, the second shaft 22 slides in the third acceleration segment 513, and the first torsion swing arm 30 and the second torsion swing arm 60 are unfolded relative to each other. When the foldable assembly 100 is switched from the unfolded state to an intermediate state, the damping assembly 80 is in the second resistance state, the second shaft 22 slides in the third gentle speed segment 514 and the fourth gentle speed segment 515, and the first torsion swing arm 30 and the second torsion swing arm 60 gradually approach each other. When the foldable assembly 100 is switched from the intermediate state to a folded state, the damping assembly 80 is in the third resistance state, the second shaft 22 slides in the fourth acceleration segment 516, and the first torsion swing arm 30 and the second torsion swing arm 60 are folded relative to each other.

By designing of a structure of the second sliding groove 51, a rotation and folding trajectory of the second torsion swing arm 60 can be effectively defined, a rotation effect of the foldable assembly 100 can be ensured. In addition, a hand feeling of unfolding and folding the foldable assembly 100 in place can be ensured while a climbing feature of a cam is kept. Therefore, a stage in which the damping force provided by the second elastic member 85 is greater than the second peak value K2 may be prolonged as much as possible during rotation of the second torsion swing arm 60. In other words, during folding of the foldable assembly 100, a range of a rotational angle of the foldable assembly 100 corresponding to the first gentle speed segment 114 and the second gentle speed segment 115 may be large, and a range of a rotational angle of the foldable assembly 100 corresponding to the first acceleration segment 113 and the second acceleration segment 116 may be small, effectively prolonging a stage in which the foldable assembly 100 is hovered with the greatest damping.

In this embodiment of this application, the third acceleration segment 513 and the fourth acceleration segment 516 may be rotationally symmetrical. That is, the third acceleration segment 513 can be rotated around a fixed point to be changed into the fourth acceleration segment 516, and the fourth acceleration segment 516 can be rotated around the same fixed point to be changed into the third acceleration segment 513.

It should be noted that, in this embodiment of this application, an angle at which the third acceleration segment 513 is rotated to be changed into the fourth acceleration segment 516 or an angle at which the fourth acceleration segment 516 is rotated to be changed into the third acceleration segment 513 is not strictly limited, and the angle may be any angle, for example, 170° or 180°, on the basis of meeting working requirements of the foldable assembly 100.

Therefore, because the third acceleration segment 513 and the fourth acceleration segment 516 are rotationally symmetrical, and the third gentle speed segment 514 and fourth gentle speed segment 515 are rotationally symmetrical, the third segment 511 and the fourth segment 512 may be rotationally symmetrical. In other words, the third segment 511 can be rotated around a fixed point to be changed into the fourth segment 512, and the fourth segment 512 can be rotated around the same fixed point to be changed into the third segment 511. By dividing of the structure of the second sliding groove 51 into two segments, an absolute value of a slope at a joint of the third segment 511 and the fourth segment 512 may change slightly because the third segment 511 and the fourth segment 512 are rotationally symmetrical. A slight change of the absolute value of the slope can enable a speed at which the second shaft 22 moves from an end of the third segment 511 to a start of the fourth segment 512 to change slightly, helping to prolong the sliding stage S2, and further prolonging the stage in which the foldable assembly 100 may be hovered. In addition, because the stage in which the foldable assembly 100 is hovered with the greatest damping is prolonged, a range of an angle at which the foldable assembly 100 may be hovered may be further expanded, helping to implement hovering of the foldable assembly 100 at a large angle. For example, a range of an angle at which a foldable assembly is hovered in conventional technologies is 80° to 120°, and a range of an angle at which the foldable assembly 100 is hovered in the technical solution of this application may be 30° to 150°.

For example, the second shaft 22 passes the third acceleration segment 513, the third gentle speed segment 514, the fourth gentle speed segment 515, and the fourth acceleration segment 516 in sequence. It may be known that, based on a change of an absolute value of a slope of the third acceleration segment 513 and a change of an absolute value of a slope of the third gentle speed segment 514 in the third segment 511, a speed of the second shaft 22 in the third segment 511 is fast first and then slow. It may be known that, based on the change of an absolute value of a slope of the fourth gentle speed segment 515 and an absolute value of a slope of the fourth acceleration segment 516 in the fourth segment 512, a speed of the second shaft 22 in the fourth segment 512 is slow first and then fast. This enables a movement speed of the second shaft 22 to be divided into three stages, namely, "acceleration, a slow speed, and acceleration". The movement speed of the second shaft 22 is related to the damping force provided by the second elastic member 85. When the second shaft 22 starts to move slowly in a second stage, the damping force provided by the second elastic member 85 is greater than the second peak value K2, and the foldable assembly 100 enters a hovering stage. When slow movement of the second shaft 22 in the second stage ends and the second shaft 22 starts acceleration in a third stage, the damping force provided by the second elastic member 85 is less than the second peak value K2, and the foldable assembly 100 is unfolded or folded.

It should be noted that, in this embodiment of this application, an angle at which the third segment 511 is rotated to be changed into the fourth segment 512 or an angle at which the fourth segment 512 is rotated to be changed into the third segment 511 is not strictly limited, and the angle may be any angle, for example, 170° or 180°, on the basis of meeting working requirements of the foldable assembly 100. For example, as shown in FIG. 9, the third segment 511 may be rotated around a midpoint of a line O2 to be changed into the fourth segment 512.

In a possible implementation, as shown in FIG. 18 and FIG. 20, the third acceleration segment 513 and the fourth acceleration segment 516 are both straight line segments. In this implementation, as shown in FIG. 18, the third gentle speed segment 514 and the fourth gentle speed segment 515 may be straight line segments, so that the second sliding groove 51 presents a broken line shape as a whole that includes only straight line segments. Alternatively, as shown in FIG. 20, the third gentle speed segment 514 and the fourth gentle speed segment 515 may be arc segments, so that the second sliding groove 51 presents a curve shape as a whole in which an arc segment and a straight line segment are mixed.

In another possible implementation, as shown in FIG. 19 and FIG. 21, both the third acceleration segment 513 and the fourth acceleration segment 516 are arc segments, and a center of curvature of the third acceleration segment 513 and a center of curvature of the fourth acceleration segment 516 are located on two sides of the second sliding groove 51 respectively. That the center of curvature of the third acceleration segment 513 and a center of curvature of the fourth acceleration segment 516 are located on two sides of the second sliding groove 51 respectively may be understood as that the center of curvature of the third acceleration segment 513 and the center of curvature of the fourth acceleration segment 516 are located on one side of the second sliding groove 51 and an opposite side of the second sliding groove 51 respectively with the second sliding groove 51 as a reference object. In addition, the center of curvature of the third acceleration segment 513 and the center of curvature of the third gentle speed segment 514 are located on a same side of the second sliding groove 51, and the center of curvature of the fourth acceleration segment 516 and the center of curvature of the fourth gentle speed segment 515 are located on a same side of the second sliding groove 51.

In this implementation, as shown in FIG. 19, the third gentle speed segment 514 and the fourth gentle speed segment 515 may be straight line segments, so that the second sliding groove 51 presents a curve shape as a whole in which an arc segment and a straight line segment are mixed. Alternatively, as shown in FIG. 21, the third gentle speed segment 514 and the fourth gentle speed segment 515 may be arc segments, so that the second sliding groove 51 presents a curve shape as a whole that includes only arc segments.

Figure 23:
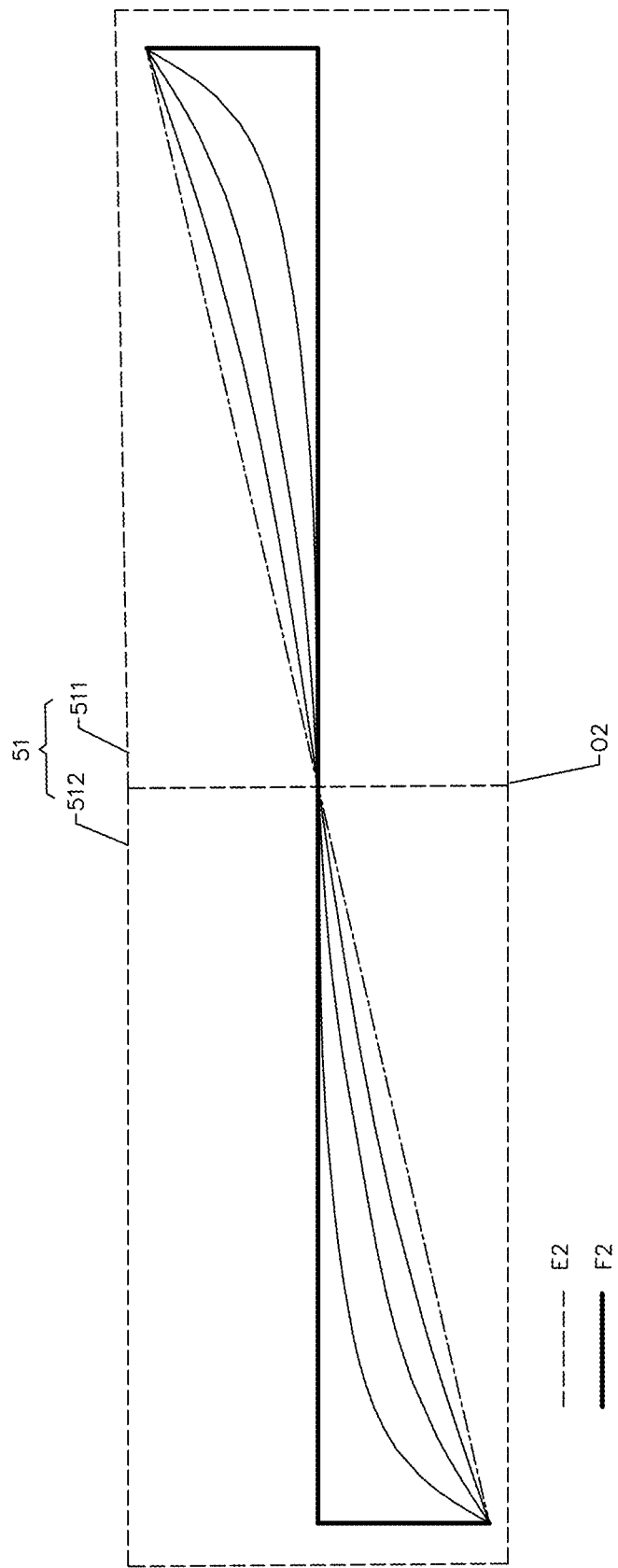
FIG. 23 is a schematic diagram of shape deformation of the second sliding groove shown in FIG. 7.

FIG. 23 is a schematic diagram of shape deformation of the second sliding groove 51 shown in FIG. 7. A line E2 is a reference line of a shape of the second sliding groove 51, and a line F2 is a limit line of the shape of the second sliding groove 51.

As shown in FIG. 23, the shape of the second sliding groove 51 may be designed within a range of the line E2 and the line F2 (including the line F2), which is not strictly limited.

The foregoing descriptions are merely implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A foldable assembly, comprising:
    a first main swing arm, wherein a first sliding groove extends in the first main swing arm, the first sliding groove comprises a first segment and a second segment connected to each other, and an absolute value of a slope of the first segment is greater than an absolute value of a slope of the second segment;
    a first torsion swing arm, wherein the first torsion swing arm comprises a first end and a second end;

a first shaft, wherein the first shaft passes through the first end and the first sliding groove, and connects the first torsion swing arm and the first main swing arm; and a damping assembly, wherein the damping assembly is connected to the second end, when the first torsion swing arm rotates relative to the damping assembly, the first shaft moves from the first segment to the second segment, the damping assembly is changed from a first resistance state to a second resistance state, and a rotational resistance of the damping assembly in the second resistance state to the first torsion swing arm is greater than a rotational resistance of the damping assembly in the first resistance state to the first torsion swing arm.

2. The foldable assembly according to claim 1, wherein the first sliding groove further comprises a third segment and a fourth segment, one end of the third segment is connected to the second segment, the other end of the third segment is connected to the fourth segment, an absolute value of a slope of the fourth segment is greater than an absolute value of a slope of the third segment, and the third segment and the second segment are rotationally symmetric; and wherein the first shaft moves from the second segment to the third segment, the damping assembly maintains the second resistance state, the first shaft moves from the third segment to the fourth segment, the damping assembly is changed from the second resistance state to a third resistance state, and a rotational resistance of the damping assembly in the second resistance state to the first torsion swing arm is greater than a rotational resistance of the damping assembly in the third resistance state to the first torsion swing arm.

3. The foldable assembly according to claim 2, wherein a center of curvature of the first segment and a center of curvature of the fourth segment are located on two sides of the first sliding groove respectively.

4. The foldable assembly according to claim 2, wherein the first segment and the fourth segment are both straight line segments.

5. The foldable assembly according to claim 2, wherein the first segment and the fourth segment are rotationally symmetrical.

6. The foldable assembly according to claim 2, wherein a center of curvature of the second segment and a center of curvature of the third segment are located on two sides of the first sliding groove respectively.

7. The foldable assembly according to claim 6, wherein the center of curvature of the second segment and the center of curvature of the first segment are located on a same side of the first sliding groove, and the center of curvature of the third segment and the center of curvature of the fourth segment are located on a same side of the first sliding groove.

8. The foldable assembly according to claim 6, wherein the second segment and the third segment are both straight line segments.

9. The foldable assembly according to claim 1, wherein the foldable assembly further comprises a first rotating shaft, the first rotating shaft passes through the second end, and the damping assembly comprises a first cam structure, a second cam structure, a first elastic member, and a limiting member; and the first cam structure is fixed to the second end and sleeved on the first rotating shaft, the second cam structure is sleeved on the first rotating shaft and contacts the first cam structure, the limiting member is fixed to the first rotating shaft, the first elastic member abuts between the second cam structure and the limiting member, and the second cam structure is configured to move along the first rotating shaft when pushed by the first cam structure, to compress or release the first elastic member.

10. A foldable assembly, comprising:
a first main swing arm, wherein a first sliding groove extends in the first main swing arm, the first sliding groove comprises a first segment and a second segment connected to each other, and an absolute value of a slope of the first segment is greater than an absolute value of a slope of the second segment;

a first torsion swing arm, wherein the first torsion swing arm comprises a first end and a second end;

a first shaft, wherein the first shaft passes through the first end and the first sliding groove, the first shaft connects the first torsion swing arm and the first main swing arm, and the first shaft is capable of sliding in the first sliding groove;

a first rotating shaft, wherein the first rotating shaft passes through the second end; and a damping assembly, wherein the damping assembly comprises a first cam structure, a second cam structure, a first elastic member, and a limiting member, the first cam structure is fixed to the second end and sleeved on the first rotating shaft, the second cam structure is sleeved on the first rotating shaft and contacts the first cam structure, the first elastic member abuts between the second cam structure and the limiting member, and the second cam structure is configured to move along the first rotating shaft when pushed by the first cam structure, to compress or release the first elastic member.

11. The foldable assembly according to claim 10, wherein the first sliding groove further comprises a third segment and a fourth segment, one end of the third segment is connected to the second segment, the other end of the third segment is connected to the fourth segment, a slope of the fourth segment is greater than a slope of the third segment, and the third segment and the second segment are rotationally symmetrical.

12. The foldable assembly according to claim 11, wherein a center of curvature of the first segment and a center of curvature of the fourth segment are located on two sides of the first sliding groove respectively.

13. An electronic device, wherein the electronic device comprises a flexible display and the foldable assembly according to claim 1, and the flexible display is disposed on the foldable assembly.

14. An electronic device, wherein the electronic device comprises a flexible display and the foldable assembly according to claim 10, and the flexible display is disposed on the foldable assembly.

* * * * *